United States Patent
Kaji

(10) Patent No.: US 7,389,165 B2
(45) Date of Patent: *Jun. 17, 2008

(54) ATTITUDE ANGLE CONTROL APPARATUS, ATTITUDE ANGLE CONTROL METHOD, ATTITUDE ANGLE CONTROL APPARATUS CONTROL PROGRAM, AND MARINE VESSEL NAVIGATION CONTROL APPARATUS

(75) Inventor: Hirotaka Kaji, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 861 days.

This patent is subject to a terminal disclaimer.

(21) Appl. No.: 10/809,680

(22) Filed: Mar. 26, 2004

(65) Prior Publication Data
US 2004/0193338 A1  Sep. 30, 2004

(30) Foreign Application Priority Data
Mar. 31, 2003  (JP) ............................ 2003-094697

(51) Int. Cl.
 *G06F 17/00*  (2006.01)
 *G05D 1/02*  (2006.01)
(52) U.S. Cl. .................. 701/21; 703/2; 440/1; 701/123
(58) Field of Classification Search .................. 701/21, 701/123; 703/2; 440/1
See application file for complete search history.

(56) References Cited

U.S. PATENT DOCUMENTS

| 5,785,562 | A | 7/1998 | Nestvall | |
|---|---|---|---|---|
| 6,458,003 | B1 | 10/2002 | Krueger | |
| 6,549,830 | B2 * | 4/2003 | Harada et al. | 701/21 |
| 6,801,839 | B2 * | 10/2004 | Kaji | 701/21 |
| 6,885,919 | B1 * | 4/2005 | Wyant et al. | 701/21 |
| 7,243,009 | B2 * | 7/2007 | Kaji | 701/21 |
| 2004/0006423 | A1 * | 1/2004 | Fujimoto et al. | 701/201 |

FOREIGN PATENT DOCUMENTS

| JP | 61-012498 | 1/1986 |
|---|---|---|
| JP | 63-301196 | 12/1988 |
| JP | 05-008792 | 1/1993 |
| JP | 06-040391 | 2/1994 |
| JP | 08-040380 | 2/1996 |
| JP | 09-076992 | 3/1997 |
| JP | 2001-152898 | 6/2001 |

* cited by examiner

*Primary Examiner*—Thomas G Black
*Assistant Examiner*—Lin B. Olsen
(74) *Attorney, Agent, or Firm*—Keating and Bennett, LLP

(57) ABSTRACT

An attitude angle control apparatus, an attitude angle control method, and an attitude angle control apparatus control program select an optimum attitude angle in a short period of time without being affected by disturbances at sea by measuring attitude angles and specific fuel consumption during navigation for any combination of a hull and propeller, create a statistical model based on the measured data, and select an optimum attitude angle on the statistical model. A marine vessel navigation control apparatus includes a constant-speed navigation controller and a trim angle controller. The trim angle controller includes an evaluated-value calculation module which calculates evaluated values of the trim angle, a storage medium, a statistical model creation module which creates statistical models using the evaluated values stored in the storage medium as an explained variable, and predetermined information including the trim angle as an explanatory variable, and a target trim angle calculation module which calculates a target trim angle based on the statistical model.

47 Claims, 10 Drawing Sheets

ANTECEDENT MEMBERSHIP FUNCTION

FUZZY RULE

AMOUNT OF CHANGE IN ENGINE SPEED
(rpm/500ms)

ENGINE SPEED DEVIATION
(rpm)

ANTECEDENT MEMBERSHIP FUNCTION

AMOUNT OF CHANGE IN ENGINE SPEED

| | NL | ZR | PL |
|---|---|---|---|
| NL | 8.621 | 0.345 | -0.345 |
| ZR | 4.138 | 0.000 | -4.138 |
| PL | 0.345 | -0.345 | -8.621 |

ENGINE SPEED DEVIATION

AMOUNT OF CHANGE IN THROTTLE VALVE POSITION
(%/500ms)

FUZZY RULE

ATTITUDE ANGLE CONTROL APPARATUS, ATTITUDE ANGLE CONTROL METHOD, ATTITUDE ANGLE CONTROL APPARATUS CONTROL PROGRAM, AND MARINE VESSEL NAVIGATION CONTROL APPARATUS

BACKGROUND OF THE INVENTION

1. Field of the Invention

The present invention relates to an attitude angle control apparatus which controls an attitude angle of a predetermined part of a marine vessel, such as the attitude angle of the hull, the attitude angle of a propeller, or the attitude angle of the propeller relative to the hull. More particularly, the present invention relates to an attitude angle control apparatus that improves the specific fuel consumption of the marine vessel.

2. Description of the Related Art

It has been known that, for example, by properly adjusting the attitude angle of a propeller (outboard, inboard/outboard, inboard, or waterjet) attached to a small craft, it is possible to reduce hull resistance, and consequently improve the specific fuel consumption of the small craft.

However, to improve the specific fuel consumption, it is necessary to adjust the attitude angle on a continuous basis by detecting subtle changes in engine speed and attitudes caused by ever-changing weather and hydrographic conditions. This places a heavy burden on the navigator. Thus, in many cases, even a skilled navigator makes only a few adjustments during a voyage. As for novice navigators, they mostly navigate with resistance set to the highest level, i.e., with the propeller placed closest to the marine vessel's transom (full trim-in).

In view of the above-described problems, various methods have been proposed to improve the specific fuel consumption by reducing hull resistance.

For example, an invention disclosed in Patent Document 1 (Japanese Patent Laid-Open No. 9-76992) proposes a method in which the manufacturer determines a relationship between the attitude angle of a propeller and the specific fuel consumption experimentally in the development phase before shipment and retains the relationship data in the form of a map in an electronic control unit (ECU), allowing an appropriate attitude angle to be selected according to navigational conditions.

An invention disclosed in Patent Document 2 (Japanese Patent Laid-Open No. 61-12498) proposes a method which involves fine adjustment of the attitude angle of an outboard device when the marine vessel is traveling at a fixed throttle setting and selecting the attitude angle which maximizes marine vessel speed as an optimum attitude angle. The maximum marine vessel speed means the minimum hull resistance, and thus means that the attitude angle which maximizes specific fuel consumption can be selected. Since this method determines the optimum attitude angle by measuring the relationship between attitude angle and marine vessel speed during navigation, it can be applied to any combination of a hull and outboard device.

An invention disclosed in Patent Document 3 (U.S. Pat. No. 5,785,562) proposes a method which involves fine adjustment of the attitude angle of a propeller equipped with a device which allows the marine vessel to travel at a fixed engine speed and selecting the attitude angle which minimizes the fuel consumption as an optimum attitude angle. This method can be applied to any combination of a hull and propeller as is the case with the invention disclosed in Patent Document 2.

However, according to the invention disclosed in Patent Document 1, a hull and propeller need to be selected together when conducting experiments in the development phase. Consequently, the hull and propeller are selected and provided as a pair, which limits the types of equipment that can be mounted in the marine vessel.

Also, the inventions disclosed in Patent Documents 2 and 3 involve measuring marine vessel speed and fuel consumption at each attitude angle during navigation and selecting the attitude angle which provides the best marine vessel speed and fuel consumption, but measurement on the water is prone to great error due to disturbances such as winds and waves, unlike measurement on land. Thus, long hours of measurement are required to check the effects of attitude angles accurately.

SUMMARY OF THE INVENTION

In order to overcome the problems described above, preferred embodiments of the present invention provide an attitude angle control apparatus, attitude angle control method, and attitude angle control apparatus control program which select an optimum attitude angle in a short period of time without being affected by disturbances at sea by measuring attitude angles and specific fuel consumption during navigation for a hull or propeller or combination thereof, creating a statistical model based on the measured data, and selecting an optimum attitude angle based on the statistical model.

It should be noted, as used herein, the term "specific fuel consumption" refers to an actual total fuel consumption divided by an actual total distance traveled, within a certain time period.

To achieve the advantages described above, a first aspect of various preferred embodiments of the present invention relates to an attitude angle control apparatus which controls an attitude angle of a part of a marine vessel, including:

a measuring device for measuring the attitude angle of the part of the marine vessel and specific fuel consumption of the marine vessel or alternative values relating to the specific fuel consumption of the marine vessel;

a statistical model generator for generating a statistical model based on data from the measuring device; and an attitude angle controller for selecting an optimum attitude angle of the part of the marine vessel based on the statistical model generated by the statistical model generator.

A second aspect of various preferred embodiments of the present invention relates to the attitude angle control apparatus according to the first aspect, wherein the attitude angle controller controls the attitude angle of the part of the marine vessel based on the optimum attitude angle.

A third aspect of various preferred embodiments of the present invention relates to the attitude angle control apparatus according to the first aspect, wherein the attitude angle controller includes a target attitude angle calculator for calculating a target value of the attitude angle of the part of the marine vessel based on the specific fuel consumption or the alternative values relating to the fuel consumption and based on the statistical model generated by the statistical model generator.

A fourth aspect of various preferred embodiments of the present invention relates to the attitude angle control apparatus according to the third aspect, wherein the target attitude angle calculator calculates, based on the statistical model generated by the statistical model generator, the attitude angle at which the specific fuel consumption reaches a maximum value, as the target value of the attitude angle.

A fifth aspect of various preferred embodiments of the present invention relates to the attitude angle control apparatus according to the third aspect, wherein if a difference between the target value of the attitude angle calculated by the target attitude angle calculator and a current attitude angle exceeds a limit, the target attitude angle calculator sets the limit as the target value of the attitude angle.

A sixth aspect of various preferred embodiments of the present invention relates to the attitude angle control apparatus according to the first aspect, wherein the part of the marine vessel is at least one of a hull and a propeller.

A seventh aspect of various preferred embodiments of the present invention relates to the attitude angle control apparatus according to the sixth aspect, wherein the attitude angle controller controls an angle of the propeller with respect to the hull.

An eighth aspect of various preferred embodiments of the present invention relates to the attitude angle control apparatus according to the first aspect, wherein the alternative values relating to the specific fuel consumption include at least one of actual total fuel consumption, engine speed, navigational speed, and throttle opening.

A ninth aspect of various preferred embodiments of the present invention relates to the attitude angle control apparatus according to the first aspect, wherein the measuring device includes a constant-speed navigation controller measuring and controlling a target engine speed and a valve position of an electronic throttle valve unit of the marine vessel.

A tenth aspect of various preferred embodiments of the present invention relates to the attitude angle control apparatus according to the first aspect, wherein the attitude angle controller includes a trim angle controller controlling a power trim and tilt unit of the marine vessel.

An eleventh aspect of various preferred embodiments of the present invention relates to the attitude angle control apparatus according to the first aspect, wherein the statistical model generator calculates estimated values of a plurality of parameters needed to generate the statistical model.

A twelfth aspect of various preferred embodiments of the present invention relates to the attitude angle control apparatus according to the first aspect, wherein the statistical model generator generates the statistical model using one of a least squares method, a weighted least squares method, and a robust estimation method.

A thirteenth aspect of various preferred embodiments of the present invention relates to the attitude angle control apparatus according to the first aspect, wherein the statistical model generator sets an attitude angle determined based on a plurality of conditions within a numeric range around the attitude angle which provides an optimum value for the statistical model, as a target value of the attitude angle.

A fourteenth aspect of various preferred embodiments of the present invention relates to a marine vessel navigation control apparatus which controls navigation of a marine vessel, wherein the marine vessel navigation control apparatus includes the attitude angle control apparatus according to the first aspect described above.

A fifteenth aspect of various preferred embodiments of the present invention relates to the marine vessel navigation control apparatus according to the fourteenth aspect, further including an outboard device including at least one of an electronic throttle valve defining a thrust regulator and a power trim and tilt unit defining the attitude angle controller.

A sixteenth aspect of various preferred embodiments of the present invention relates to the marine vessel navigation control apparatus according to the fourteenth aspect, wherein the measuring device includes a constant-speed navigation controller including a target engine speed calculator that determines a target engine speed of the marine vessel and an electronic-throttle valve position calculator that determines a valve position of an electronic throttle valve to determine total fuel consumption and a speed of the marine vessel for calculating the specific fuel consumption of the marine vessel.

A seventeenth aspect of various preferred embodiments of the present invention relates to a method of controlling an attitude angle of a part of a marine vessel, the method including the steps of:

measuring the attitude angle of the part of the marine vessel and specific fuel consumption of the marine vessel or alternative values relating to the specific fuel consumption of the marine vessel;

generating a statistical model based on data obtained from the measuring step; and selecting an optimum attitude angle of the part of the marine vessel based on the statistical model generated by the statistical model generating step.

An eighteenth aspect of various preferred embodiments of the present invention relates to the method of controlling an attitude angle of a part of a marine vessel according to the seventeenth aspect, further including the step of controlling the attitude angle of the part of the marine vessel based on the optimum attitude angle.

A nineteenth aspect of various preferred embodiments of the present invention relates to the method of controlling an attitude angle of a part of a marine vessel according to the seventeenth aspect, further including the step of calculating a target value of the attitude angle of the part of the marine vessel based on the specific fuel consumption or the alternative values relating to the fuel consumption and based on the statistical model generated in the statistical model generating step.

A twentieth aspect of various preferred embodiments of the present invention relates to the method of controlling an attitude angle of a part of a marine vessel according to the nineteenth aspect, wherein in the step of calculating the target attitude angle, the attitude angle at which the specific fuel consumption reaches a maximum value is calculated as the target value of the attitude angle based on the statistical model generated by the statistical model generating step.

A twenty-first aspect of various preferred embodiments of the present invention relates to the method of controlling an attitude angle of a part of a marine vessel according to the twentieth aspect, wherein if a difference between the target value of the attitude angle and a current attitude angle exceeds a limit, the limit is set as the target value of the attitude angle.

A twenty-second aspect of various preferred embodiments of the present invention relates to the method of controlling an attitude angle of a part of a marine vessel according to the eighteenth aspect, wherein the part of the marine vessel of which the attitude angle is controlled is at least one of a hull and a propeller.

A twenty-third aspect of various preferred embodiments of the present invention relates to the method of controlling an attitude angle of a part of a marine vessel according to the twenty-second aspect, wherein an angle of the propeller with respect to the hull is controlled.

A twenty-fourth aspect of various preferred embodiments of the present invention relates to the method of controlling an attitude angle of a part of a marine vessel according to the seventeenth aspect, wherein the alternative values relating to the specific fuel consumption include at least one of actual total fuel consumption, engine speed, navigational speed, and throttle opening.

A twenty-fifth aspect of various preferred embodiments of the present invention relates to the method of controlling an attitude angle of a part of a marine vessel according to the seventeenth aspect, further including the steps of measuring and controlling a target engine speed and a valve position of an electronic throttle valve unit of the marine vessel.

A twenty-sixth aspect of various preferred embodiments of the present invention relates to the method of controlling an attitude angle of a part of a marine vessel according to the eighteenth aspect, wherein the attitude angle controlling step includes controlling a power trim and tilt unit of the marine vessel. A twenty-seventh aspect of various preferred embodiments of the present invention relates to the method of controlling an attitude angle of a part of a marine vessel according to the seventeenth aspect, wherein the step of generating a statistical model includes calculating estimated values of a plurality of parameters needed to generate the statistical model.

A twenty-eighth aspect of various preferred embodiments of the present invention relates to the method of controlling an attitude angle of a part of a marine vessel according to the seventeenth aspect, wherein the step of generating a statistical model includes generating the statistical model using one of a least squares method, a weighted least squares method, and a robust estimation method.

A twenty-ninth aspect of various preferred embodiments of the present invention relates to the method of controlling an attitude angle of a part of a marine vessel according to the seventeenth aspect, wherein the step of generating a statistical model includes setting an attitude angle determined based on a plurality of conditions within a numeric range around the attitude angle which provides an optimum value for the statistical model, as a target value of the attitude angle.

A thirtieth aspect of various preferred embodiments of the present invention relates to an attitude angle control apparatus control program executable by a computer to control an attitude angle control apparatus which controls an attitude angle of a part of a marine vessel, such that the attitude angle control apparatus performs the steps of the seventeenth aspect described above.

A thirty-first aspect of various preferred embodiments of the present invention relates to an attitude angle control apparatus which controls an attitude angle of a part of a marine vessel, the apparatus including:

specific fuel consumption acquisition means for acquiring specific fuel consumption of the marine vessel or alternative values relating to the specific fuel consumption;

evaluated-value calculation means for calculating evaluated values of the attitude angle of the part of the marine vessel based on the specific fuel consumption or the alternative values relating to the specific fuel consumption acquired by the specific fuel consumption acquisition means;

information acquisition means for acquiring information relating to the evaluated values calculated by the evaluated-value calculation means, the information acquired by the information acquisition means including at least the attitude angle of the part of the marine vessel;

information storage means for storing the evaluated values calculated by the evaluated-value calculation means and the information acquired by the information acquisition means;

statistical model generating means for generating a statistical model using the specific fuel consumption as an explained variable and the attitude angle of the predetermined part as an explanatory variable based on the evaluated values calculated by the evaluated-value calculation means and information stored in the information storage means;

target attitude angle calculation means for calculating a target value of the attitude angle of the part of the marine vessel based on the specific fuel consumption or the alternative values relating to the specific fuel consumption and based on the statistical model generated by the statistical model generating means; and attitude angle control means for controlling the attitude angle of the part of the marine vessel so as to match the target value calculated by the target attitude angle calculation means.

A thirty-second aspect of various preferred embodiments of the present invention relates to the attitude angle control apparatus according to the thirty-first aspect, wherein the alternative values relating to the specific fuel consumption include at least one of actual total fuel consumption, engine speed, navigational speed, and throttle opening.

A thirty-third aspect of various preferred embodiments of the present invention relates to the attitude angle control apparatus according to the thirty-first aspect, wherein each time the evaluated values are calculated by the evaluated-value calculation means and the information acquired by the information acquisition means are newly obtained, the statistical model generating means generates a statistical model based on the newly obtained evaluated values and acquired information.

A thirty-fourth aspect of various preferred embodiments of the present invention relates to the attitude angle control apparatus according to the thirty-first aspect, wherein the statistical model generating means calculates estimated values of a plurality of parameters needed to generate the statistical model.

A thirty-fifth aspect of various preferred embodiments of the present invention relates to the attitude angle control apparatus according to the thirty-first aspect, wherein the target attitude angle calculation means calculates, based on the statistical model generated by the statistical model generating means, the attitude angle at which the specific fuel consumption reaches a maximum value, as the target value of the attitude angle.

A thirty-sixth aspect of various preferred embodiments of the present invention relates to the attitude angle control apparatus according to the thirty-first aspect, wherein if a difference between the target value of the attitude angle calculated by the target attitude angle calculation means and a current attitude angle exceeds a limit, the target attitude angle calculation means sets the limit as the target value of the attitude angle.

A thirty-seventh aspect of various preferred embodiments of the present invention relates to the attitude angle control apparatus according to the thirty-first aspect, wherein the statistical model generating means generates the statistical model using one of a least squares method, a weighted least squares method, and a robust estimation method.

A thirty-eighth aspect of various preferred embodiments of the present invention relates to the attitude angle control apparatus according to the thirty-first aspect, wherein the statistical model generating means sets an attitude angle determined based on a plurality of conditions within a numeric range around the attitude angle which provides an optimum value for the statistical model, as the target value of the attitude angle.

A thirty-ninth aspect of various preferred embodiments of the present invention relates to the attitude angle control apparatus according to the thirty-first aspect, wherein when acquiring the evaluated values at an initial stage of control, the statistical model generating means adjusts an acquisition range of the evaluated values to include the attitude angle which provides an optimum value for a statistical model generated in the past by the statistical model generating means.

A fortieth aspect of various preferred embodiments of the present invention relates to the attitude angle control apparatus according to the thirty-first aspect, wherein the part of the marine vessel that attitude angle control apparatus controls is at least one of a hull and a propeller.

A forty-first aspect of various preferred embodiments of the present invention relates to the attitude angle control apparatus according to the thirty-first aspect, wherein the specific fuel consumption acquisition means includes a constant-speed navigation controller controlling a target engine speed and a valve position of an electronic throttle valve unit of the marine vessel.

A forty-second aspect of various preferred embodiments of the present invention relates to the attitude angle control apparatus according to the thirty-first aspect, wherein the attitude angle control means includes a trim angle controller controlling a power trim and tilt unit of the marine vessel.

A forty-third aspect of various preferred embodiments of the present invention relates to a marine vessel navigation control apparatus which controls navigation of a marine vessel, wherein the marine vessel navigation control apparatus includes the attitude angle control apparatus according to the thirty-first aspect described above.

A forty-fourth aspect of various preferred embodiments of the present invention relates to the marine vessel navigation control apparatus according to the forty-third aspect, further including an outboard device including at least one of an electronic throttle valve defining a thrust regulator and a power trim and tilt unit defining the attitude angle control means.

A forty-fifth aspect of various preferred embodiments of the present invention relates to the marine vessel navigation control apparatus according to the forty-third aspect, wherein the specific fuel consumption acquisition means includes a constant-speed navigation controller including a target engine speed calculation means for determining a target engine speed of the marine vessel and an electronic-throttle valve position calculation means for determining a valve position of an electronic throttle valve to determine total fuel consumption and a speed of the marine vessel for calculating the specific fuel consumption of the marine vessel.

A forty-sixth aspect of various preferred embodiments of the present invention relates to a method for controlling an attitude angle of a part of a marine vessel, the method including the steps of:

acquiring specific fuel consumption of the marine vessel or alternative values relating to the specific fuel consumption;

calculating evaluated values of the attitude angle of the part of the marine vessel based on the specific fuel consumption or the alternative values relating to the acquired specific fuel consumption;

acquiring information relating to the evaluated values of the attitude angle of the part of the marine vessel, the information acquired including at least the attitude angle of the part of the marine vessel;

generating a statistical model using the specific fuel consumption as an explained variable and the attitude angle of the part of the marine vessel as an explanatory variable based on the evaluated values calculated and the information acquired;

calculating a target value of the attitude angle of the part of the marine vessel based on the specific fuel consumption or the alternative values relating to the specific fuel consumption and based on the generated statistical model; and controlling the attitude angle of the part of the marine vessel so as to match the calculated target value.

A forty-seventh aspect of various preferred embodiments of the present invention relates to an attitude angle control apparatus control program executable by a computer to control an attitude angle control apparatus which controls an attitude angle of a part of a marine vessel, such that the attitude angle control apparatus performs the steps of the forty-sixth aspect described above.

A forty-eighth aspect of various preferred embodiments of the present invention relates to an attitude angle control apparatus which controls an attitude angle of a predetermined part provided in a marine vessel, the apparatus including:

specific fuel consumption acquisition means for acquiring specific fuel consumption of the marine vessel or alternative values;

evaluated-value calculation means for calculating evaluated values of the attitude angle of the predetermined part based on the specific fuel consumption or alternative values acquired by the specific fuel consumption acquisition means;

information acquisition means for acquiring predetermined information which concerns the evaluated values and includes at least the attitude angle of the predetermined part;

information storage means for storing the evaluated values calculated by the evaluated-value calculation means and the predetermined information acquired by the information acquisition means;

statistical model generating means for generating a statistical model using the specific fuel consumption as an explained variable and the attitude angle of the predetermined part as an explanatory variable based on the evaluated values and predetermined information stored in the information storage means;

target attitude angle calculation means for calculating a target value of the attitude angle of the predetermined part based on the specific fuel consumption or alternative values and on the statistical model generated by the statistical model generating means; and attitude angle control means for controlling the attitude angle of the predetermined part so that it will match the target value calculated by the target attitude angle calculation means.

With this configuration, the specific fuel consumption acquisition means can acquire specific fuel consumption of the marine vessel or alternative values, the evaluated-value calculation means can calculate evaluated values of the attitude angle of the predetermined part based on the specific fuel consumption or alternative values acquired by the specific fuel consumption acquisition means, the information acquisition means can acquire predetermined information which concerns the evaluated values and includes at least the attitude angle of the predetermined part, the information storage means can store the evaluated values calculated by the evaluated-value calculation means and the predetermined information acquired by the information acquisition means, the statistical model generating means can generate a statistical model using the specific fuel consumption as an explained variable and the attitude angle of the predetermined part as an explanatory variable based on the evaluated values and predetermined information stored in the information storage means, the target attitude angle calculation means can calculate a target value of the attitude angle of the predetermined part based on the specific fuel consumption or alternative values and on the statistical model generated by the statistical model generating means, and the attitude angle control means can control the attitude angle of the predetermined part so that it will match the target value calculated by the target attitude angle calculation means.

Thus, for any combination of a hull and propeller, for example, since the attitude angle control apparatus measures attitude angles and specific fuel consumption during navigation, creates a statistical model based on the measured data, and selects an optimum attitude angle of the propeller with respect to the hull on the statistical model, it can select the optimum attitude angle in a short period of time without being affected by disturbances at sea.

The "part of a marine vessel" referred to in the above-described aspects of various preferred embodiments of the present invention includes at least one of a hull or a propeller (outboard, inboard/outboard, inboard, or waterjet).

Also, the statistical model that is generated describes an explained variable (also referred to as a criterion variable, outcome variable, response variable, or dependent variable) regarded to be a random variable using explanatory variables (also referred to as independent variables) treated as non-random measured values or observed values. Known statistical models include, multiple regression models, discriminate models, classification trees (decision trees), autoregressive models, autoregressive moving average models, neural network models, etc.

Also, the specific fuel consumption can be determined by dividing an actual amount of fuel consumed by an actual distance traveled, within a certain time period.

A forty-ninth aspect of various preferred embodiments of the present invention relates to the attitude angle control apparatus according to the forty-eighth aspect, wherein the alternative values of the specific fuel consumption include at least one of fuel consumption, engine speed, the marine vessel's navigation speed, and throttle opening.

That is, the alternative values of the specific fuel consumption may be at least fuel consumption, engine speed, the marine vessel's navigation speed, or throttle opening.

Thus, the alternative values allow the following 12 items to be optimized, making it possible to improve fuel consumption efficiency.

(1) Minimize engine speed at a fixed throttle opening (2) Maximize marine vessel speed at a fixed throttle opening (3) Minimize fuel consumption at a fixed throttle opening (4) Maximize specific fuel consumption at a fixed throttle opening (5) Minimize throttle opening at a fixed engine speed (6) Maximize marine vessel speed at a fixed engine speed (7) Minimize fuel consumption at a fixed engine speed (8) Maximize specific fuel consumption at a fixed engine speed (however, a marine vessel navigation control apparatus is needed to keep the engine speed constant)

(9) Minimize throttle opening at a fixed marine vessel speed

(10) Minimize engine speed at a fixed marine vessel speed

(11) Minimize specific fuel consumption at a fixed marine vessel speed

(12) Maximize specific fuel consumption at a fixed marine vessel speed (however, a marine vessel navigation control apparatus is needed to keep the marine vessel speed constant)

The fuel consumption can be measured directly with a fuel flowmeter or calculated from the duration of injection from an injector.

A fiftieth aspect of various preferred embodiments of the present invention relates to the attitude angle control apparatus according to the forty-eighth aspect, wherein each time evaluated values and predetermined information are newly obtained, the statistical model generating means generates a statistical model based on the newly obtained evaluated values and predetermined information.

That is, each time evaluated values and predetermined information are newly obtained, the attitude angle control apparatus can make the statistical model generating means generate a statistical model based on the newly obtained evaluated values and predetermined information.

For example, by creating a statistical model sequentially, it is possible to travel at around an estimated optimum trim angle from the initial stage of optimization without making the behavior of the hull unstable by unnecessarily increasing the trim angle. This makes it possible to increase the accuracy of the statistical model gradually, and thus allows stable optimization.

A fifty-first aspect of various preferred embodiments of the present invention relates to the attitude angle control apparatus according to any of the forty-eighth to fiftieth aspects, wherein the statistical model generating means can calculate estimated values of various parameters needed in order to generate the statistical model.

That is, the attitude angle control apparatus can make the statistical model generating means calculate estimated values of various parameters needed in order to generate the statistical model.

For example, a structure of a statistical model which represents relationship between the specific fuel consumption and trim angle of a small craft traveling at a constant speed can be determined experimentally in advance. Thus, by designating, for example, a quadratic polynomial as the statistical model, the specific fuel consumption as an explained variable y, and the trim angle as an explanatory variable x, it is possible to estimate the parameters by estimating partial regression coefficients $\beta 0$, $\beta 1$, and $\beta 2$ in Equation (1) below using the least squares method or the like.

$$y = \beta 0 + \beta 1 \times x + \beta 2 \times x^2 \tag{1}$$

A fifty-second aspect of various preferred embodiments of the present invention relates to the attitude angle control apparatus according to any of the forty-eighth to fifty-first aspects, wherein the target attitude angle calculation means calculates, based on the statistical model, the attitude angle at which the specific fuel consumption reaches its maximum, as the target value of the attitude angle.

That is, the attitude angle control apparatus can make the target attitude angle calculation means calculate, based on the statistical model, the attitude angle at which the specific fuel consumption reaches its maximum, as the target value of the attitude angle.

For example, a statistical model created based on sample values of specific fuel consumption and trim angles allows an estimated value of specific fuel consumption for a specific trim angle to be output. Since the trim angle which maximizes the estimated value of specific fuel consumption is expected to maximize the actual specific fuel consumption, it is possible to obtain optimum specific fuel consumption by calculating the trim angle which maximizes the estimated value of specific fuel consumption and outputting it as a new target trim angle.

A fifty-third aspect of various preferred embodiments of the present invention relates to the attitude angle control apparatus according to any of the forty-eighth to fifty-second aspects, wherein if difference between the target value of the attitude angle calculated by the target attitude angle calculation means and current attitude angle exceeds a preset limit, the target attitude angle calculation means sets the limit as the target value of the attitude angle.

That is, if the difference between the target value of the attitude angle calculated by the target attitude angle calculation means and current attitude angle exceeds a preset limit, this limit can be set as the target value of the attitude angle.

For example, when optimizing the trim angle, which is a parameter used to adjust hull resistance, changing it abruptly will cause abrupt changes to the load on the outboard device and to steering characteristics, which may give anxiety to the user. This situation can be avoided by setting an upper limit of about ±2°, for example, on the range within which the trim angle can be adjusted at a single time, and then outputting a target trim angle calculated based on the statistical model if the difference between the current trim angle and target trim angle does not exceed the upper limit of the adjustment range or outputting the upper limit of the adjustment range as the new target trim angle if the upper limit of the adjustment range is exceeded.

A fifty-fourth aspect of various preferred embodiments of the present invention relates to the attitude angle control apparatus according to any of the forty-eighth to fifty-third aspects, wherein the statistical model generating means generates the statistical model using a least squares method, weighted least squares method, or robust estimation method.

That is, the attitude angle control apparatus can make the statistical model generating means generate the statistical model using a least squares method, weighted least squares method, or robust estimation method.

For example, if a statistical model is created with sample values concentrated around the trim angle which gives the optimum value, there is a chance that a small number of sample values at the ends will have a great effect. This effect can be reduced using a weighted least squares method or robust estimation method.

A fifty-fifth aspect of various preferred embodiments of the present invention relates to the attitude angle control apparatus according to any of the forty-eighth to fifty-fourth aspects, wherein the statistical model generating means sets an attitude angle determined based on predetermined conditions within a predetermined numeric range around the attitude angle which gives an optimum value for the statistical model, as the target value of the attitude angle.

That is, the attitude angle control apparatus can make the statistical model generating means set an attitude angle determined based on predetermined conditions within a predetermined numeric range around the attitude angle which gives an optimum value for the statistical model, as the target value of the attitude angle.

For example, by intentionally dispersing sample values around the attitude angle which gives the optimum value, it is possible to improve the accuracy of the statistical model. Specifically, if a current trim angle T matches an optimum trim angle Tb, a value with random variation introduced is output as a target trim angle Tt.

A fifty-sixth aspect of various preferred embodiments of the present invention relates to the attitude angle control apparatus according to any of the forty-eighth to fifty-fifth aspects, wherein when acquiring the evaluated values at an initial stage of control, the statistical model generating means adjusts an acquisition range of the evaluated values in such a way as to include the attitude angle which gives the optimum value for a statistical model generated in the past.

That is, when acquiring the evaluated values at an initial stage of control, the attitude angle control apparatus can make the statistical model generating means adjust an acquisition range of the evaluated values in such a way as to include the attitude angle which gives the optimum value for a statistical model generated in the past.

For example, by adjusting an initial sampling range within the bounds of not making the operator uncomfortable based on a past statistical model, it is possible to improve the accuracy of the statistical model. Specifically, since there is no statistical model at the initial stage, the trim angle is adjusted beginning with the full trim-in position where the hull is in the most stable state. However, if a statistical model has been created once, an initial sampling range is determined using the past statistical model when newly creating a statistical model.

A fifty-seventh aspect of various preferred embodiments of the present invention relates to an attitude angle control method for controlling an attitude angle of a predetermined part provided in a marine vessel, the method including the steps of:

acquiring specific fuel consumption of the marine vessel or alternative values;

calculating evaluated values of the attitude angle of the predetermined part based on the specific fuel consumption or alternative values acquired;

acquiring predetermined information which concerns the evaluated values and includes at least the attitude angle of the predetermined part;

generating a statistical model using the specific fuel consumption as an explained variable and the attitude angle of the predetermined part as an explanatory variable based on the evaluated values calculated and the predetermined information acquired;

calculating a target value of the attitude angle of the predetermined part based on the specific fuel consumption or alternative values and on the generated statistical model; and controlling the attitude angle of the predetermined part so that it will match the calculated target value.

This method is implemented by the attitude angle control apparatus set forth in the forty-eight aspect and description of its effects is omitted to avoid redundancy.

A fifty-eighth aspect of various preferred embodiments of the present invention relates to an attitude angle control apparatus control program executable by a computer to control an attitude angle control apparatus which controls an attitude angle of a predetermined part provided in a marine vessel, the apparatus including:

a specific fuel consumption acquisition step of acquiring specific fuel consumption of the marine vessel or alternative values;

an evaluated-value calculation step of calculating evaluated values of the attitude angle of the predetermined part based on the specific fuel consumption or alternative values acquired in the specific fuel consumption acquisition step;

an information acquisition step of acquiring predetermined information which concerns the evaluated values and includes at least the attitude angle of the predetermined part;

an information storage step of storing the evaluated values calculated in the evaluated-value calculation step and the predetermined information acquired in the information acquisition step;

a statistical model generating step of generating a statistical model using the specific fuel consumption as an explained variable and the attitude angle of the predetermined part as an explanatory variable based on the evaluated values and predetermined information stored in the information storage step;

a target attitude angle calculation step of calculating a target value of the attitude angle of the predetermined part based on the specific fuel consumption or alternative values and on the statistical model generated in the statistical model generating step; and an attitude angle control step of controlling the attitude angle of the predetermined part so that it will match the target value calculated in the target attitude angle calculation step.

This program is implemented by the attitude angle control apparatus set forth in the forty-eighth aspect and description of its effects is omitted to avoid redundancy.

A fifty-ninth aspect of various preferred embodiments of the present invention relates to a marine vessel navigation control apparatus which controls navigation of a marine vessel, wherein the marine vessel navigation control apparatus includes the attitude angle control apparatus according to any of the forty-eighth to fifty-sixth aspects.

That is, the marine vessel navigation control apparatus includes the attitude angle control apparatus according to any of the forty-eighth to fifty-sixth aspects. It is equipped with a target engine speed calculation module which calculates target engine speed according to a given target marine vessel speed and a valve position calculation module which calculates the valve position of an electronic throttle valve according to the calculated target engine speed. It controls the attitude angle of a predetermined part provided in the marine vessel based on information outputted from the propeller, and thereby controls the marine vessel's navigation conditions.

Other features, elements, steps, characteristics and advantages of the present invention will become more apparent from the following detailed description of preferred embodiments thereof with reference to the attached drawings.

DETAILED DESCRIPTION OF THE PREFERRED EMBODIMENTS

Preferred embodiments of the present invention will be described with reference to the drawings. FIGS. 1 to 13 are diagrams showing preferred embodiments of a marine vessel navigation control system equipped with an attitude angle control apparatus for small craft according to the present invention.

It should be noted that, as used herein, the term "module" refers to an algorithm, series of steps or instructions or processes that are performed to achieve certain results or operations, and may take the form of computer software, machine-executable or computer-executable code or instructions, or for operation and/or execution on a processor-based system such as a computer or other system or apparatus, or a signal carrier wave format to be used with an Internet based system. Alternatively, the term "module" can also refer to an actual device or unit provided in a marine vessel that is capable of performing the functions described with respect to each module.

Also it should be noted that, as used herein, the term "marine vessel" preferably refers to a ship or a boat or other such marine apparatuses.

Figure 1:
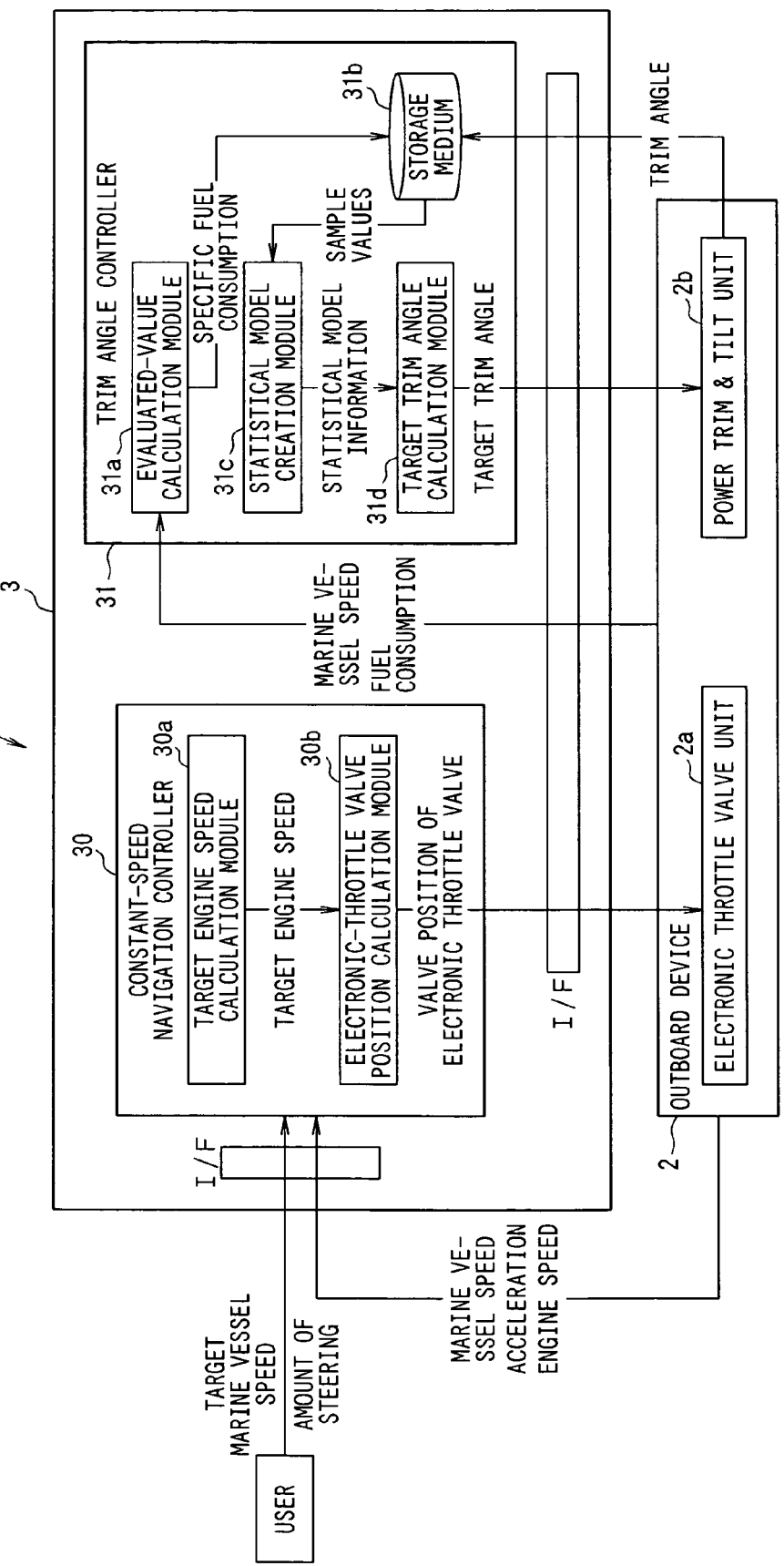
FIG. 1 is a block diagram showing a marine vessel navigation control system according to a preferred embodiment of the present invention.

First, a configuration of the marine vessel navigation control system according to a preferred embodiment of the present invention will be described with reference to FIG. 1. FIG. 1 is a block diagram showing the marine vessel navigation control system according to a preferred embodiment of the present invention.

The marine vessel navigation control system 1 preferably includes an outboard device 2 and a marine vessel navigation control apparatus 3.

The outboard device 2 preferably includes an electronic throttle valve 2a functioning as a thrust regulator and a power trim & tilt (hereinafter abbreviated to PTT) unit 2b functioning as an attitude angle regulator.

The marine vessel navigation control apparatus 3 includes a constant-speed navigation controller 30 and trim angle controller 31.

The constant-speed navigation controller 30 includes a target engine speed calculation module 30a which calculates target engine speed based on predetermined input information and an electronic-throttle valve position calculation module 30b which calculates the valve position of an electronic throttle valve according to the calculated target engine speed.

The target engine speed calculation module 30a includes a fuzzy logic system. The target engine speed calculation module 30a is fed with marine vessel speed deviation (the difference between current marine vessel speed and target marine vessel speed) and acceleration, estimates the amount of change in target engine speed, and outputs current target engine speed by adding the target engine speed obtained by the previous calculation to the estimation result.

The electronic-throttle valve position calculation module 30b includes a fuzzy logic system, as is the case with the target engine speed calculation module 30a. The electronic-throttle valve position calculation module 30b is fed engine speed deviation (the difference between current engine speed and target engine speed) and the amount of change in the target engine speed, estimates the amount of change in the valve position of the electronic throttle valve, and outputs the current valve position of the electronic throttle valve by adding the valve position of the electronic throttle valve obtained by the previous calculation to the estimation result. Fuzzy tables in the fuzzy logic system are designed based on seamanship of skilled navigators, a simplified reasoning method is used, and fuzzy rules in the reasoning method are represented by real numbers.

The trim angle controller 31 includes an evaluated-value calculation module 31a which calculates evaluated values of the trim angle, a storage medium 31b which stores predetermined information and evaluated values by associating them with each other, where the predetermined information includes at least the trim angle, a statistical model creation module 31c which creates statistical models using the evaluated values stored in the storage medium 31b as an explained variable, and the predetermined information including at least the trim angle as an explanatory variable, and a target trim angle calculation module 31d which calculates a target trim angle based on the statistical model.

The evaluated-value calculation module 31a calculates specific fuel consumption from fuel consumption and travel distance and outputs the calculated specific fuel consumption as an evaluated value of the trim angle, where the fuel consumption is measured by a fuel flowmeter inserted in a fuel passage extending from a fuel tank to a fuel injector of the outboard device 2 while the travel distance is calculated from marine vessel speed measured by a speedometer. The storage medium 31b stores the trim angle and the specific fuel consumption at the given trim angle as a pair.

The statistical model creation module 31c estimates partial regression coefficients of a given regression equation by the least squares method using the evaluated values stored in the storage medium 31b as an explained variable, and the trim angle as an explanatory variable. Then, it creates a statistical model based on the estimation result.

A target trim angle calculation module 31d calculates target trim angles based on the statistical model created by the statistical model creation module 31c.

A specific operation of the marine vessel navigation control system 1 will be described with reference to FIGS. 2A, 2B, 3A, 3B, 4, 5A and 5B.

Figure 2A:
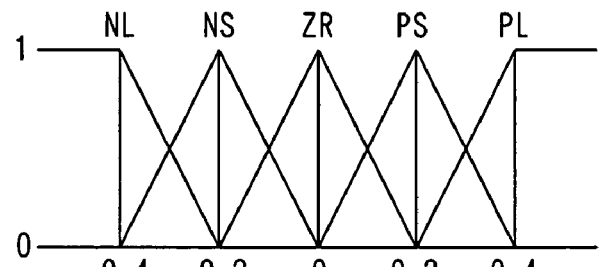
FIGS. 2A and 2B are explanatory diagrams of a fuzzy rule used by a target engine speed calculation module to calculate target engine speed.
Figure 2B:
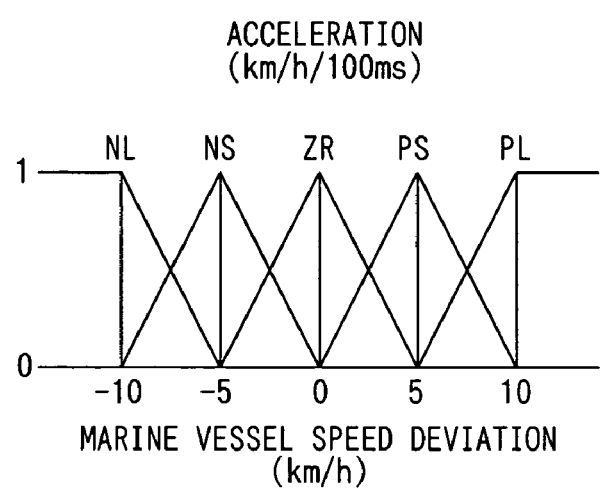
Figures 3A, 3B:
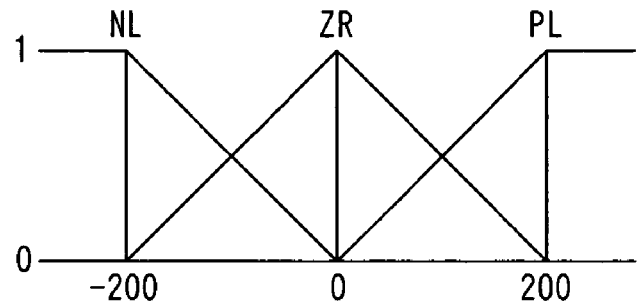
FIGS. 3A and 3B are explanatory diagrams of a fuzzy rule used by an electronic-throttle valve position calculation module to calculate the valve position of an electronic throttle valve.
Figure 4:
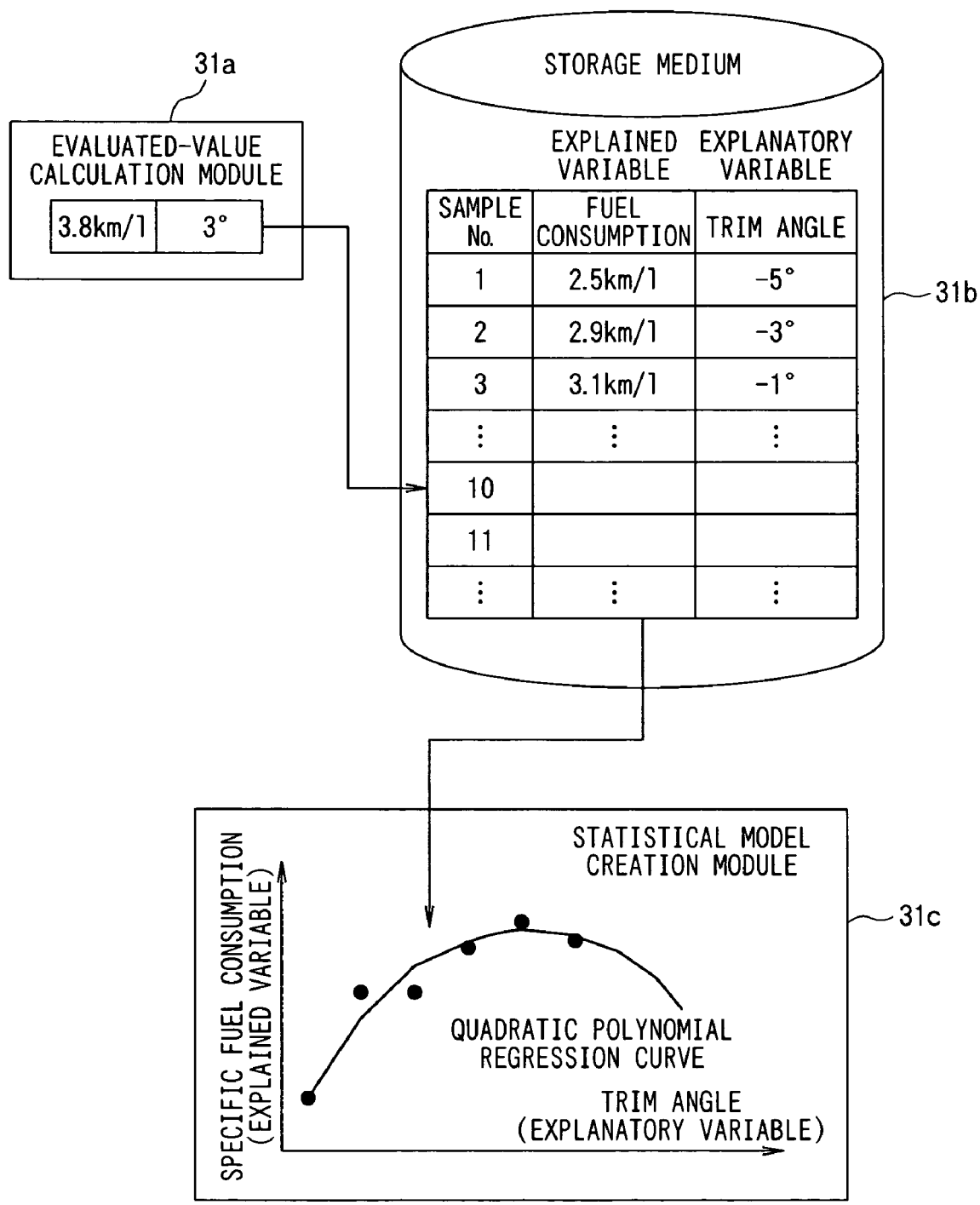
FIG. 4 is a diagram showing data flow among an evaluated-value calculation module, a storage medium, and a trim angle controller.
Figure 5A:
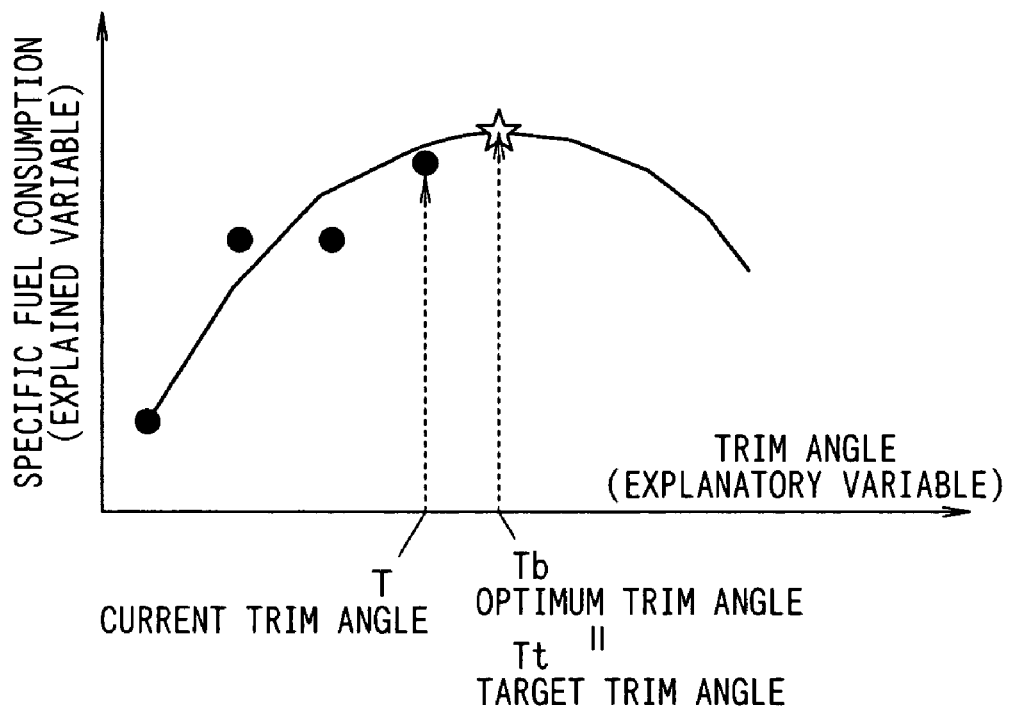
FIGS. 5A and 5B are diagrams showing a relationship between specific fuel consumption and trim angle.
Figure 5B:
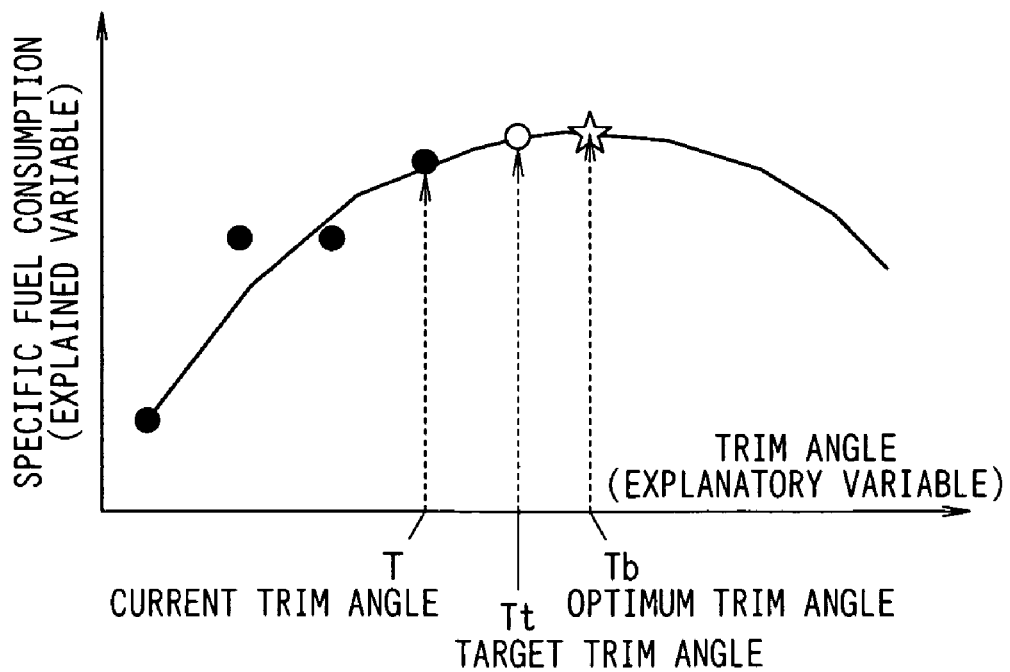

FIGS. 2A and 2B are explanatory diagrams of a fuzzy rule used by the target engine speed calculation module 30a to calculate target engine speed, FIGS. 3A and 3B are explanatory diagrams of a fuzzy rule used by the electronic-throttle valve position calculation module 30b to calculate the valve position of the electronic throttle valve, FIG. 4 is a diagram showing data flow among the evaluated-value calculation module 31a, the storage medium 31b, and the trim angle controller 31, and FIGS. 5A and 5B are diagrams showing a relationship between specific fuel consumption and trim angle.

The present preferred embodiment will be described with reference to an example in which the system 1 is applied to a marine vessel equipped with an outboard device which in turn is equipped with an electronic-throttle valve unit and the trim angle of the outboard device (hereinafter referred to as the trim angle) is controlled when the marine vessel is traveling at a constant speed set by the user.

First, the user sets a target marine vessel speed. As the target marine vessel speed, the user may enter any desired value or select from among multiple values prepared at the factory. Once the target marine vessel speed is set, an initial value of the target engine speed is set based on the target marine vessel speed. For example, if the current navigation speed of the marine vessel is around the target marine vessel speed, the current engine speed is set as the target engine speed, but if the current navigation speed of the marine vessel is not around the target marine vessel speed, a predetermined initial value of the target engine speed is used. As the initial value of the target engine speed, the user may enter any desired value or select from among multiple values prepared at the factory.

Once the initial value of the target engine speed is set, the target engine speed corresponding to the navigation speed at the time is calculated under the actual navigation conditions of the marine vessel based on the fuzzy rule shown in FIGS. 2A and 2B. Specifically, inferred values of marine vessel speed deviation and acceleration are obtained using a membership function shown in FIG. 2A, and then the fuzzy rule shown in FIG. 2B is applied to the inferred values of marine vessel speed deviation and acceleration to determine a weighted average and calculate the amount of change in the target engine speed. In the membership function, the marine vessel speed deviation (difference between target marine vessel speed and actual marine vessel speed) is determined from detected values of actual marine vessel speed, and the acceleration is calculated from the marine vessel speed. As shown in FIG. 2A, the membership function gives four values each of the marine vessel speed deviation and acceleration: large and small positive values (PL and PS) and large and small negative values (NL and NS). These values are weighted and averaged based on the fuzzy rule shown in FIG. 2B. Thus, the amount of change in the target engine speed is determined. Then, by adding the amount of change to the current target engine speed, a new target engine speed is determined.

Then, the target engine speed calculation module 30a outputs the target engine speed to the electronic-throttle valve position calculation module 30b, which then calculates throttle valve position based on the received target engine speed. As is the case with the target engine speed calculation module 30a, the electronic-throttle valve position calculation module 30b calculates the throttle valve position using the fuzzy logic system. Specifically, upon acquiring the target engine speed from the target engine speed calculation module 30a, the electronic-throttle valve position calculation module 30b infers values of engine speed deviation from detected values of the engine speed using a membership function shown in FIG. 3A and calculates the amount of change in the engine speed from the detected values of the engine speed. Thus, as is the case with FIGS. 2A and 2B above, the amount of change in the throttle valve position is determined by weighting and averaging the values of the membership function based on the fuzzy rule shown in FIG. 3B. Then, by adding the amount of change to the valve position of the electronic throttle valve, new valve position of the electronic throttle valve is determined.

When the electronic throttle valve position is newly calculated in this way, the constant-speed navigation controller 30 controls the electronic throttle valve unit 2a so as to comply with the newly calculated electronic throttle valve position.

In this preferred embodiment, it is assumed that the trim angle is controlled within a range of about −5° to about 8°, for example.

The trim angle is normally adjusted by the user with a trim switch, and if trim angle control is selected when the marine vessel is traveling at a constant speed, the trim angle control is started.

Once the trim angle control is started, the trim angle controller 31 controls the PTT unit 2b so that the initial trim angle will be about "−5°." At the same time, the evaluated-value calculation module 31a calculates the specific fuel consumption over a certain period, specifically, for example, by dividing the distance traveled in approximately 20 seconds, which is calculated from the average marine vessel speed over the approximately 20 seconds, by the fuel consumption measured by a fuel flowmeter (not shown) for the approximately 20 seconds. Then, the evaluated values (pairs of a trim angle and specific fuel consumption which are hereinafter referred to as sample values) obtained are stored one after another in the storage medium 31b as shown in FIG. 4. It should be noted that the specific time period set for calculating the specific fuel consumption can be any period of time and can be set as desired.

According to this preferred embodiment, the trim angle is set subsequently to, for example, about "−3°," "−1°," and "1°" in increments of about "2°" and sample values of the specific fuel consumption are acquired at the four trim angles as the initial sample values.

After the initial sample values are acquired, the statistical model creation module 31c estimates partial regression coefficients β0, β1, and β2 of a predetermined quadratic polynomial (2) below by the least squares method using the fuel consumption in the sample values as an explained variable y, and the trim angle as an explanatory variable t, as shown in FIG. 4:

$$y = \beta 0 + \beta 1 \times t + \beta 2 \times t^2 \quad (2)$$

As a solution to the least squares method, this preferred embodiment preferably uses the steepest-descent method because of ease of implementation in an ECU (not shown) installed in the marine vessel.

Then, the target trim angle calculation module 31d determines t which maximizes y in a range of "−5≦t≦8" using the quadratic polynomial and outputs it as the target trim angle Tt.

When the new target trim angle Tt is calculated, the trim angle controller 31 controls the PTT unit 2b so as to comply with the newly calculated target trim angle Tt.

Furthermore, the evaluated-value calculation module 31a calculates the specific fuel consumption again from the target trim angle Tt. Then, the statistical model creation module 31c acquires the new sample value and creates a new statistical model by repeating the above procedures again. In this way, the quadratic polynomial (2) is updated sequentially, and optimization is completed when the target trim angle calculated by the target trim angle calculation module 31d stops changing.

Generally, the methodology for creating statistical models from sample values and performing optimization on the statistical models is known as response surface methodology, of which the Monte Carlo method or experimental design is used to obtain sample values efficiently. Specifically, random sampling is performed so as to cover an area in which sample values are obtained or sampling is performed using a method (Latin square design or orthogonal design) based on experimental design.

However, this preferred embodiment is intended to optimize the trim angle, which is a parameter used to adjust hull resistance, and changing it abruptly will cause abrupt changes to the load on the outboard device and to the steering characteristics, which may cause anxiety to the user.

To avoid this situation, according to this preferred embodiment, initial sample values are acquired at around the full trim-in position, which gives the most stable value. Specifically, for example, the initial target trim angle is preferably set to about "−5°" at the beginning of optimization and subsequently the trim angle is set to about "−3°," "−1°," and "1°" in increments of about "2°." When sample values of the specific fuel consumption are acquired at the four trim angles, the statistical model creation module 31c sets up a polynomial regression equation. This makes it possible to calculate optimum values without increasing the trim angle unduly.

Furthermore, this preferred embodiment sets limits on the amount of change in the trim angle. Specifically, for example, the limit on the amount of a single change in the trim angle is preferably set at about ±2°. Then, if the difference between the current trim angle and target trim angle does not exceed the change limit as shown in FIG. 5A, the target trim angle is output as it is, but if the change limit is exceeded as shown in FIG. 5B, the limit is output as a new target trim angle. This eliminates the chance of causing abrupt changes to the trim angle and thereby giving anxiety to the user.

By repeating the above-described operations, it is possible to select the optimum trim angle using a small number of sample values even in an environment that is prone to disturbances.

Figure 9:
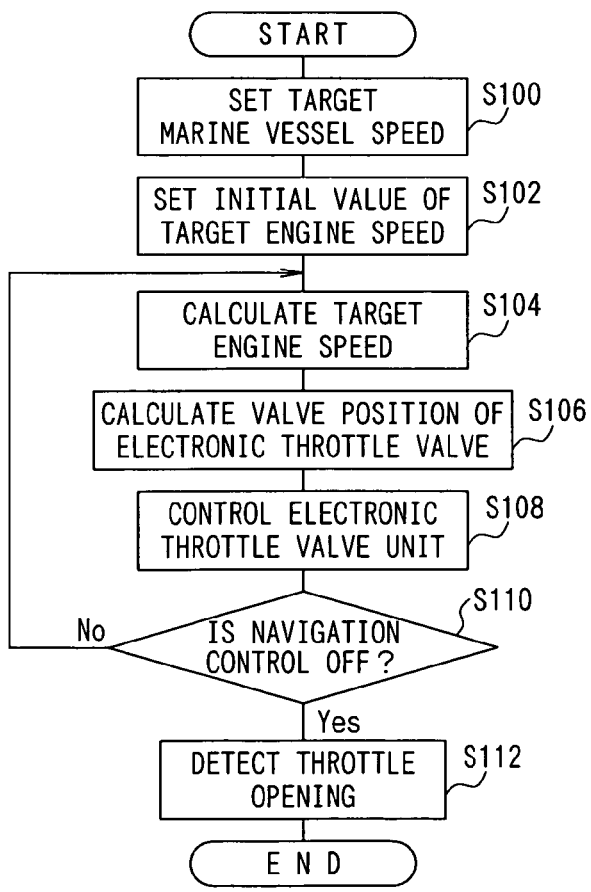
FIG. 9 is a flowchart showing operation processes of a constant-speed navigation controller.

Now, a flow of operation processes of the constant-speed navigation controller 30 will be described with reference to FIG. 9. FIG. 9 is a flowchart showing operation processes of the constant-speed navigation controller 30.

As shown in FIG. 9, first, the constant-speed navigation controller 30 sets the target marine vessel speed in Step S100, and then the process advances to Step S102.

Regarding the target marine vessel speed, the user may enter any desired value or select from among multiple values prepared at the factory, as described above.

In Step S102, the constant-speed navigation controller 30 sets the initial value of the target engine speed, and then the process advances to Step S104. Regarding the initial value of the target engine speed, the user may enter any desired value or select from among multiple values prepared at the factory, as described above.

In Step S104, the constant-speed navigation controller 30 makes the target engine speed calculation module 30a calculate the target engine speed using the fuzzy logic system as described above and inputs the calculation result to the electronic-throttle valve position calculation module 30b. Then, the process advances to Step S106.

In Step S106, the constant-speed navigation controller 30 makes the electronic-throttle valve position calculation module 30b calculate the valve position of the electronic throttle valve based on the inputted target engine speed using the fuzzy logic system as described above. Then, the process advances to Step S108.

In Step S108, the constant-speed navigation controller 30 controls the electronic throttle valve unit 2a of the outboard device 2 based on the calculated electronic throttle valve position. Then, the process advances to Step S110.

In Step S110, the constant-speed navigation controller 30 judges whether navigation control is OFF. If it is determined that the navigation control is OFF (Yes), the constant-speed navigation controller 30 proceeds to Step S112.

Otherwise (No), the process advances to Step S104.

In Step S112, the constant-speed navigation controller 30 detects the throttle opening, and then it finishes processing.

Figure 10:
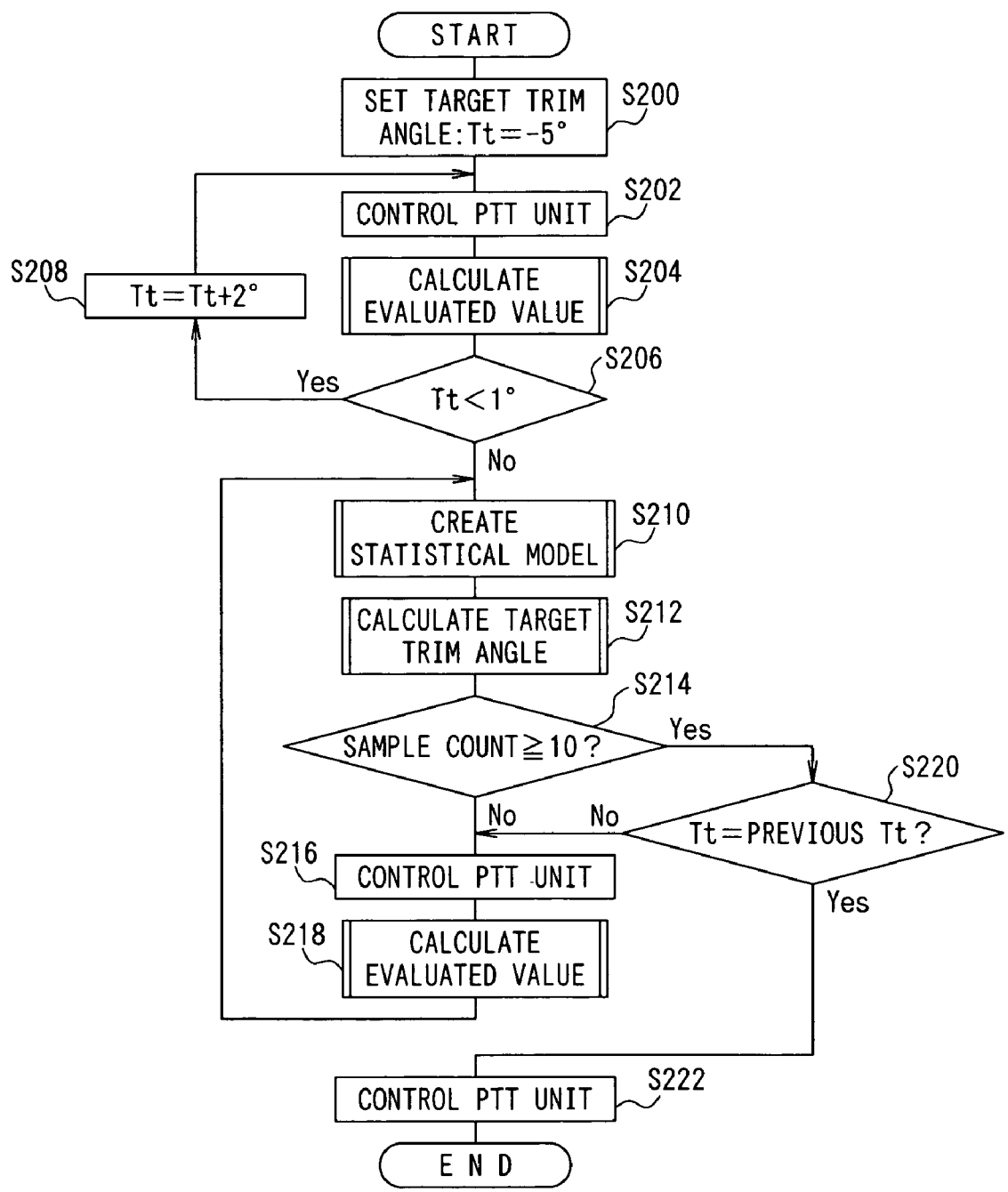
FIG. 10 is a flowchart showing operation processes of the trim angle controller.

Now, a flow of operation processes of the trim angle controller 31 will be described with reference to FIG. 10. FIG. 10 is a flowchart showing operation processes of the trim angle controller 31.

As shown in FIG. 10, first the trim angle controller 31 sets the initial target trim angle Tt to, for example, about "−5°" in Step S200, and then the process advances to Step S202.

In Step S202, the trim angle controller 31 controls the PTT unit 2b so that the current trim angle T will match the target trim angle Tt. Then, the process advances to Step S204.

In Step S204, the trim angle controller 31 makes the evaluated-value calculation module 31a calculate the specific fuel consumption based on the distance traveled in, for example, about 20 seconds and the fuel consumption for the same period and stores the calculation result in the storage medium 31b. Then, the process advances to Step S206.

In Step S206, the trim angle controller 31 judges whether the trim angle has reached "1°." If the trim angle has not reached "1°" (No), the trim angle controller 31 goes to Step S208. If the trim angle has reached "1°" (Yes), the trim angle controller 31 advances the process to Step S210.

In Step S210, the trim angle controller 31 makes the statistical model creation module 31c create a statistical model using the sample values stored in the storage medium 31b. Then, the process advances to Step S212.

In Step S212, the trim angle controller 31 makes the target trim angle calculation module 31d optimize the created statistical model and calculate the trim angle which gives the optimum evaluated value, as the target trim angle Tt. Then, the process advances to Step S214.

In Step S214, the trim angle controller 31 judges whether 10 or more sample values of the specific fuel consumption have already been obtained. If 10 or more sample values have not been obtained yet (No), the process advances to Step S216. If 10 or more sample values have been obtained (Yes), the process advances to Step S220.

In Step S216, the trim angle controller 31 controls the PTT unit 2b so that the current trim angle T will match the target trim angle Tt. Then, the process advances to Step S218.

In Step S218, the trim angle controller 31 makes the evaluated-value calculation module 31a calculate the specific fuel consumption based on the distance traveled in, for example, about 20 seconds and fuel consumption for the same period and stores the calculation result in the storage medium 31b. Then, the process advances to Step S210.

In Step S220, the trim angle controller 31 judges whether the current target trim angle Tt matches the previous target trim angle Tt. If they do not match (No), the trim angle controller 31 advances the process to Step S216. If they match (Yes), the process advances to Step S222.

In Step S222, the trim angle controller 31 controls the PTT unit 2b so that the current trim angle T will match the target trim angle Tt, and then processing is completed.

Figure 11:
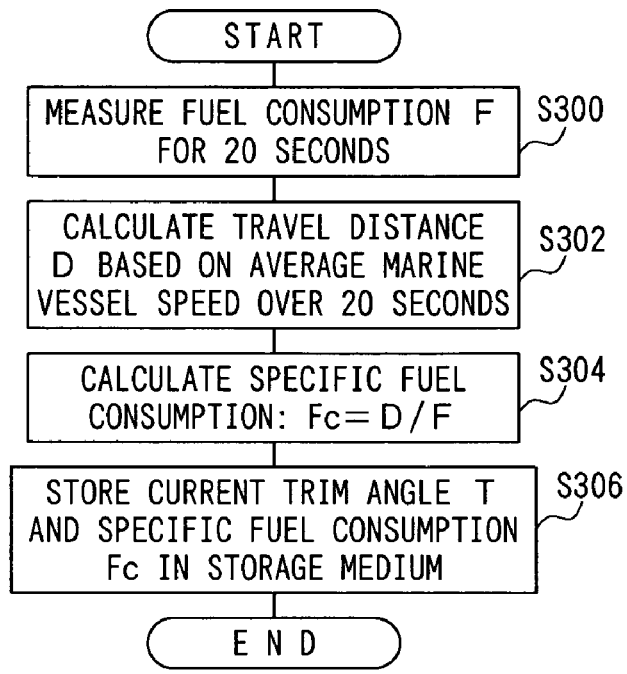
FIG. 11 is a flowchart showing operation processes of the evaluated-value calculation module.

Now, a flow of operation processes of the evaluated-value calculation module 31a will be described with reference to FIG. 11. FIG. 11 is a flowchart showing operation processes of the evaluated-value calculation module 31a.

As shown in FIG. 11, first in Step S300, the evaluated-value calculation module 31a acquires the fuel consumption F measured by the fuel flowmeter for about 20 seconds, for example, and then the process advances to Step S302.

In Step S302, the evaluated-value calculation module 31a calculates the distance D traveled in the time period of approximately 20 seconds using the average marine vessel speed over the approximately 20 seconds based on the marine vessel speed acquired from the outboard device 2. Then, the evaluated-value calculation module 31a advances the process to Step S304.

According to this preferred embodiment, the processes in Steps S300 and S302 are preferably performed concurrently.

In Step S304, the evaluated-value calculation module 31a calculates the specific fuel consumption Fc based on the fuel consumption F and travel distance D using Equation (3) below. Then, it goes to Step S306.

$$Fc = D/F \quad (3)$$

In Step S306, the evaluated-value calculation module 31a stores the current trim angle T and specific fuel consumption Fc in the storage medium 31b, and then processing is completed.

Figure 12:
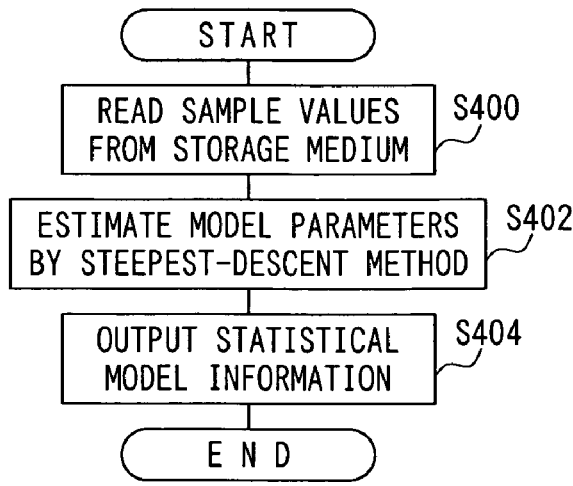
FIG. 12 is a flowchart showing operation processes of a statistical model creation module.

Now, a flow of operation processes of the statistical model creation module 31c will be described with reference to FIG. 12. FIG. 12 is a flowchart showing operation processes of the statistical model creation module 31c.

As shown in FIG. 12, first the statistical model creation module 31c reads sample values from the storage medium 31b in Step S400, and then the process advances Step S402.

In Step S402, the statistical model creation module 31c estimates the partial regression coefficients $\beta 0$, $\beta 1$, and $\beta 2$ of the quadratic polynomial (Equation (2) above) by the steepest-descent method based on a least squares criterion. Then, the process advances to Step S404.

In Step S404, the statistical model creation module 31c outputs resulting statistical model information, i.e., the partial regression coefficients $\beta 0$, $\beta 1$, and $\beta 2$, to the target trim angle calculation module 31d, and then processing is completed.

Figure 13:
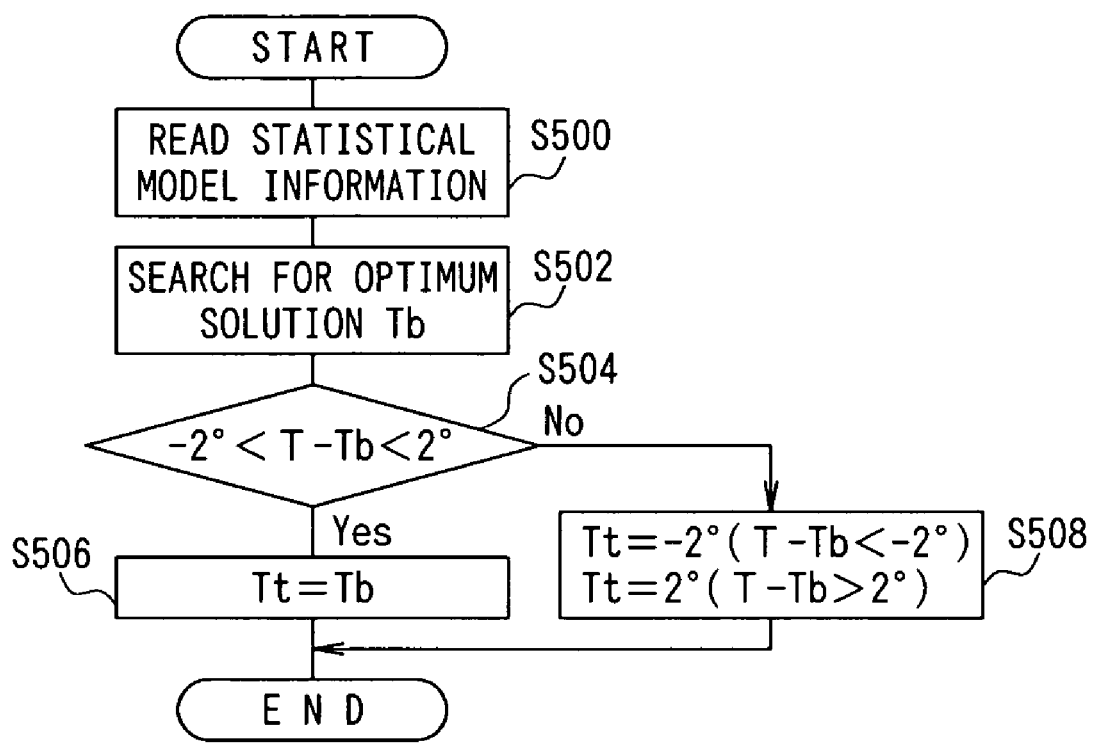
FIG. 13 is a flowchart showing operation processes of a target trim angle calculation module.

Now, a flow of operation processes of the target trim angle calculation module 31d will be described with reference to FIG. 13. FIG. 13 is a flowchart showing operation processes of the target trim angle calculation module 31d.

As shown in FIG. 13, first the target trim angle calculation module 31d acquires the partial regression coefficients $\beta 0$, $\beta 1$, and $\beta 2$ from the statistical model creation module 31c in Step S500, and then the process advances Step S502.

In Step S502, the target trim angle calculation module 31d searches for an optimum solution Tb to the predetermined quadratic polynomial which has the partial regression coefficients $\beta 0$, $\beta 1$, and $\beta 2$. Then, the target trim angle calculation module 31d advances the process to Step S504.

In Step S504, the target trim angle calculation module 31d calculates the difference between the optimum solution Tb determined as described above and the current trim angle T and judges whether "−2°<T−Tb<2°" is true or false. If it is true (Yes), the target trim angle calculation module 31d advances the process to Step S506, and if it is false (No), the target trim angle calculation module 31d advances the process to Step S508.

In Step S506, the target trim angle calculation module 31*d* outputs Tb as the target trim angle Tt, and then processing is completed.

In Step S508, the target trim angle calculation module 31*d* outputs "Tt=T+2°" if "T−Tb>2°," or "Tt=T−2°" if "T−Tb<2°," as the target trim angle Tt, and then processing is completed.

Figure 6:
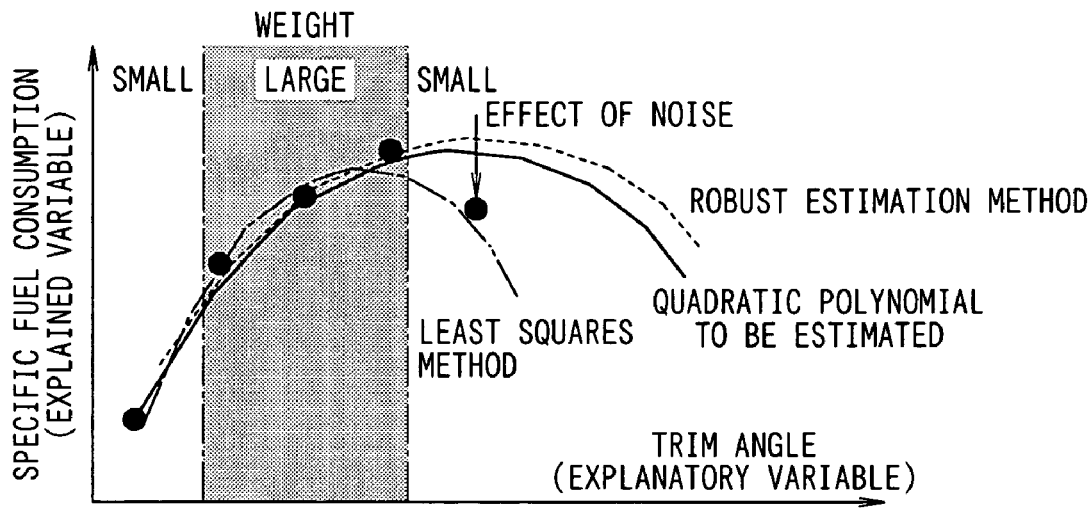
FIG. 6 is a diagram showing an example of how a quadratic polynomial is estimated by a robust estimation method.

Now, with reference to FIG. 6, a description will be given of an example of how the statistical model creation module 31*c* generates a statistical model using a robust estimation method. FIG. 6 is a diagram showing an example of how a quadratic polynomial is estimated by a robust estimation method.

Normally, the least squares method estimates a polynomial parameter which minimizes the least mean squares (LMS) criterion given by Equation (4) below.

Formula 1:

$$LMS = 1/n \sum_{i=1}^{n} (y_i - yhat_i)^2 \qquad (4)$$

where n is the number of sample values, y is a sample value, and yhat is a response surface output.

The weighted least squares method estimates polynomial parameters which minimize the least weighted squares (LWS) criterion given by Equation (5) below instead of the LMS criterion.

Formula 2:

$$LWS = 1/n \sum_{i=1}^{n} w_i(y_i - yhat_i)^2 \qquad (5)$$

where $w_i$ is a weight used to adjust the effect of each sample value on parameter estimation. For example, if it is known in advance that the variance $\sigma_2^2$ of a sample value $Y_2$ at a value $x_2$ is smaller than the variance $\sigma_1^2$ of a sample value $y_1$ at a value $x_1$, it can be said that $Y_2$ is a more accurate sample value. In such a case, if the polynomial parameters are estimated using the LMS criterion described above, the estimation may not work well due to the effect of the less accurate sample value $y_1$. Using a weight of "$w_i=1/\sigma_i^2$" can reduce the effect of sample values with large variance, and thus makes it possible to perform estimation effectively.

Various weighting methods such as the one described above have been proposed so far. Regarding the robust estimation method, for example, typical techniques include an LMedS (Least Median of Squares) technique, which estimates a response surface that minimizes an LMedS criterion given by Equation (6) below rather than the LMS criterion.

Formula 3:

$$LMedS = \text{median } (y_i - yhat_i)^2 \qquad (6)$$

where "median" means finding a median. For example, when estimating a linear model "y=α0+α1x" using three sample values including an outlier (a sample value containing an unexpectedly great noise), the magnitude of the outlier has a great effect if the LMS criterion is used, but with the LMedS criterion which involves determining a median, the magnitude of the outlier is irrelevant as can be seen from Equation (6). Thus, the LMedS criterion, which is not affected by any outlier included, allows estimation to be performed effectively.

Besides the LMedS estimation method, the robust estimation method includes other estimation methods which use order statistics, such as the least quantile of squares (LQS) estimation method, least trimmed squares (LTS) estimation method, and M estimation method (a type of weighted least squares method). Other suitable estimation methods may also be used as desired.

In performing estimation by the use of the least squares method, a small number of sample values at the end are affected greatly by noise and the like as indicated by a dash-and-dot line in FIG. 6. On the other hand, the use of the robust estimation method described above can reduce this effect as indicated by a dotted line in FIG. 6.

Figure 7:
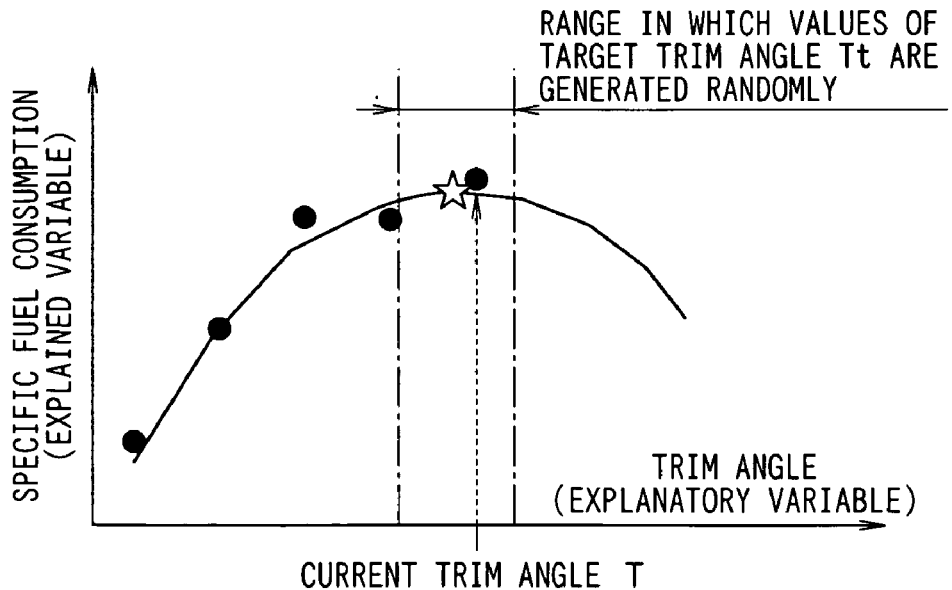
FIG. 7 is a diagram showing relationship between specific fuel consumption and trim angle, observed with values of a target trim angle Tt generated randomly.

Now, with reference to FIG. 7, a description will be given of an example of a process performed by the statistical model creation module 31*c* to increase the accuracy of statistical models. FIG. 7 is a diagram showing a relationship between specific fuel consumption and trim angle, observed with values of the target trim angle Tt generated randomly.

As shown in FIG. 7, in the case where the current trim angle T matches the optimum trim angle Tb, by generating values of the target trim angle Tt randomly in a range shown in the figure, it is possible to collect sample values evenly around the optimum trim angle Tb by avoiding concentration of sample values on the optimum trim angle Tb near the end of optimization, and thus improve the accuracy of statistical models.

Figure 8:
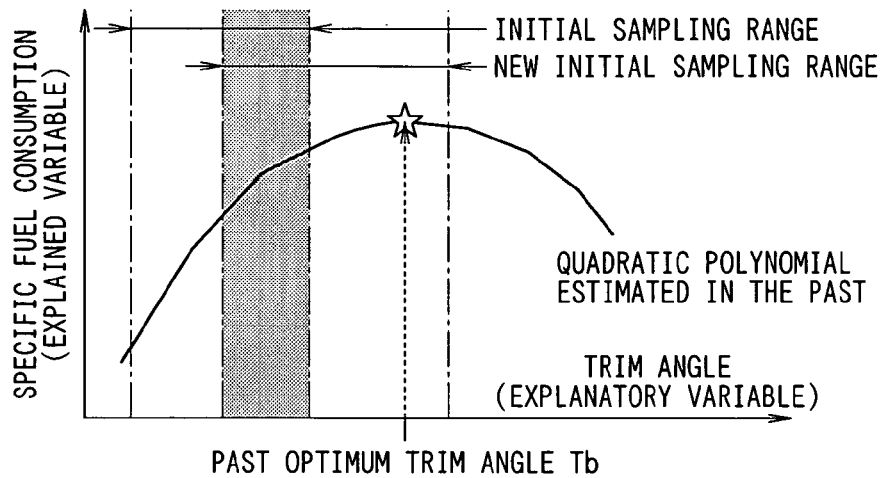
FIG. 8 is a diagram showing an example of how a past statistical model is used to adjust an acquisition range of initial sample values.

Now, with reference to FIG. 8, a description will be given of an example of how the statistical model creation module 31*c* uses past statistical models to adjust an acquisition range of initial sample values. FIG. 8 is a diagram showing an example of how a past statistical model is used to adjust the acquisition range of initial sample values.

First a description will be given of deviation of an estimated solution due to positional relation between a sampling range and an optimum solution. It is not desirable to collect sample values by varying parameters greatly when the system is actually running as is the case with this preferred embodiment because such an act will alter system behavior greatly, causing anxiety in the user. In such a case, it is useful to estimate the optimum solution by starting initial sampling in a small range where the operation is known to be stable to some extent and extending the sampling range gradually. The problem is that if sample values are affected by great noise and the optimum solution exists outside the initial sampling range, an estimated optimum solution depends on the direction of the initial sampling range and a true optimum solution cannot be obtained.

This is because the sample values picked up at the ends of the sampling range affect the shape of statistical models greatly. For example, when the effect of each sample value on a statistical model is checked by regression diagnosis using Cook's distance given by Equation (7), it can be seen that the sample values near the ends have greater effect than those in the center.

Formula 4:

$$\text{Cook's Distance} = \sum_{j=1}^{n} (yhat_{ji} - yhat_j)^2 / (p \cdot \hat{\sigma}^2) \quad (7)$$

where $yhat_j$ is an estimated value of a statistical model created using all the samples, $yhat_{ji}$ is an estimated value of a statistical model created using all the samples except the i-th sample, and p is a parameter value of the model, and $\hat{\sigma}^2$ is an estimated value of variance.

Thus, when an optimum value exists outside the initial sampling range, if noise makes sample values around a boundary far higher or lower than normally obtained, the accuracy of estimation of the optimum value deteriorates excessively. This has a fatal effect on online optimization in which the frequency of sampling is limited.

According to this preferred embodiment, if sample values at the end opposite to the full trim-in position are extremely high due to the effect of noise or the like, a very large value is estimated as the optimum trim angle Tb, but the target trim angle Tt equals the current trim angle T plus 2°. If new sample values are collected at Tt, the effect on statistical models is the greatest at Tt and the effect of the extremely high sample values described above is reduced. Thus, when sample values at an end are extremely high, optimization is carried out almost in the same manner as when the sample values at the end are normal.

On the other hand, if sample values at the end opposite to the full trim-in position are extremely low due to the effect of noise or the like, a small value is estimated as the optimum trim angle Tb, but the target trim angle Tt is smaller than the current trim angle T. If new sample values are collected at Tt, the extremely low sample values described above remain to have the greatest effect on statistical models. Thus, when sample values at an end are extremely low, Tb is estimated to be smaller than when the sample values at the end are normal.

As shown in FIG. 8, when creating a new statistical model, if a statistical model has been created once, the acquisition range of initial sample values is adjusted to include the optimum trim angle Tb determined in the past statistical model. This makes it possible to avoid the above-described problem and improve the accuracy of statistical models.

Thus, when a small craft is traveling, the evaluated-value calculation module 31a acquires the trim angle and specific fuel consumption and calculates evaluated values from the acquired data, the statistical model creation module 31c generates a statistical model based on the calculated evaluated values and the trim angle, and the target trim angle calculation module 31d can calculate an appropriate trim angle of the outboard device 2 with respect to the hull using the generated statistical model.

The acquisition of the specific fuel consumption and marine vessel speed by the evaluated-value calculation module 31a corresponds to a specific fuel consumption acquisition means, the calculation of the evaluated values by the evaluated-value calculation module 31a corresponds to an evaluated-value calculation means described, and the storage medium 31b corresponds to an information storage means. Also, the statistical model creation module 31c corresponds to a statistical model generating means, the target trim angle calculation module 31d corresponds to a target attitude angle calculation means, and the control by the trim angle controller 31 of the trim angle based on target trim angles corresponds to an attitude angle control means.

Incidentally, although according to this preferred embodiment, a predetermined quadratic polynomial is preferably used as the structure of statistical models, the statistical model creation module 31c may determine the structure of statistical models. For example, indices which represent a fit of a statistical model to sample values include information criteria typified by AIC (Akaike Information Criterion). Let F denote the degree of freedom of the model subjected to maximum likelihood estimation, the AIC is given by Equation (8) below.

$$AIC = -2 \text{ (maximum log likelihood)} + 2F \quad (8)$$

The smaller the AIC value, the better fit the statistical model is judged to provide to sample values. Thus, by creating two or more statistical models (e.g., a linear expression, quadratic polynomial, and cubic polynomial) and selecting the statistical model with the smallest AIC value, it is possible to always create the optimum statistical model.

Besides the AIC, other criteria for selecting a statistical model are available, including BIC (Bayesian Information Criteria), MDL (Minimum Description Length), Cross Validation, and FPE (Final Prediction Error). Other suitable criteria may also be used.

As described above, the attitude angle control apparatus according to preferred embodiments of the present invention can select an optimum attitude angle in a short period of time without being affected by disturbances at sea, by measuring attitude angles for a hull or a propeller or a combination thereof and specific fuel consumption during navigation, creating a statistical model based on the measured data, and selecting an optimum attitude angle of the propeller with respect to the hull based on the created statistical model.

An attitude angle control method according to preferred embodiments of the present invention is implemented by the attitude angle control apparatus and a description of its effects is omitted to avoid redundancy.

An attitude angle control apparatus control program according to a preferred embodiment of the present invention is intended to control the attitude angle control apparatus to perform the steps of the attitude angle control method, and a description of its effects is omitted to avoid redundancy.

A marine vessel navigation control apparatus according to a preferred embodiment of the present invention is equipped with the attitude angle control apparatus and description of its effects is omitted to avoid redundancy.

It should be understood that the foregoing description is only illustrative of the present invention. Various alternatives and modifications can be devised by those skilled in the art without departing from the present invention. Accordingly, the present invention is intended to embrace all such alternatives, modifications and variations which fall within the scope of the appended claims.

What is claimed is:

1. An attitude angle control apparatus which controls an attitude angle of a part of a marine vessel, comprising:

a measuring device for measuring the attitude angle of the part of the marine vessel and specific fuel consumption of the marine vessel or alternative values relating to the specific fuel consumption of the marine vessel;

a statistical model generator for generating a statistical model based on data from the measuring device; and an attitude angle controller for selecting an optimum attitude angle of the part of the marine vessel based on the statistical model generated by the statistical model generator.

2. An attitude angle control apparatus according to claim 1, wherein the attitude angle controller controls the attitude angle of the part of the marine vessel based on the optimum attitude angle.

3. An attitude angle control apparatus according to claim 1, wherein the attitude angle controller includes a target attitude angle calculator for calculating a target value of the attitude angle of the part of the marine vessel based on the specific fuel consumption or the alternative values relating to the fuel consumption and based on the statistical model generated by the statistical model generator.

4. The attitude angle control apparatus according to claim 3, wherein the target attitude angle calculator calculates, based on the statistical model generated by the statistical model generator, the attitude angle at which the specific fuel consumption reaches a maximum value, as the target value of the attitude angle.

5. The attitude angle control apparatus according to claim 3, wherein if a difference between the target value of the attitude angle calculated by the target attitude angle calculator and a current attitude angle exceeds a limit, the target attitude angle calculator sets the limit as the target value of the attitude angle.

6. An attitude angle control apparatus according to claim 1, wherein the part of the marine vessel is at least one of a hull and a propeller.

7. An attitude angle control apparatus according to claim 6, wherein the attitude angle controller controls an angle of the propeller with respect to the hull.

8. The attitude angle control apparatus according to claim 1, wherein the alternative values relating to the specific fuel consumption include at least one of actual total fuel consumption, engine speed, navigational speed, and throttle opening.

9. An attitude angle control apparatus according to claim 1, wherein the measuring device includes a constant-speed navigation controller measuring and controlling a target engine speed and a valve position of an electronic throttle valve unit of the marine vessel.

10. An attitude angle control apparatus according to claim 1, wherein the attitude angle controller includes a trim angle controller controlling a power trim and tilt unit of the marine vessel.

11. The attitude angle control apparatus according to claim 1, wherein the statistical model generator calculates estimated values of a plurality of parameters needed to generate the statistical model.

12. The attitude angle control apparatus according to claim 1, wherein the statistical model generator generates the statistical model using one of a least squares method, a weighted least squares method, and a robust estimation method.

13. The attitude angle control apparatus according to claim 1, wherein the statistical model generator sets an attitude angle determined based on a plurality of conditions within a numeric range around the attitude angle which provides an optimum value for the statistical model, as a target value of the attitude angle.

14. A marine vessel navigation control apparatus which controls navigation of a marine vessel, wherein the marine vessel navigation control apparatus comprises the attitude angle control apparatus according to claim 1.

15. A marine vessel navigation control apparatus according to claim 14, further comprising an outboard device including at least one of an electronic throttle valve defining a thrust regulator and a power trim and tilt unit defining the attitude angle controller.

16. A marine vessel navigation control apparatus according to claim 14, wherein the measuring device includes a constant-speed navigation controller including a target engine speed calculator that determines a target engine speed of the marine vessel and an electronic-throttle valve position calculator that determines a valve position of an electronic throttle valve to determine total fuel consumption and a speed of the marine vessel for calculating the specific fuel consumption of the marine vessel.

17. A method of controlling an attitude angle of a part of a marine vessel, comprising the steps of:
    measuring the attitude angle of the part of the marine vessel and specific fuel consumption of the marine vessel or alternative values relating to the specific fuel consumption of the marine vessel;
    generating a statistical model based on data obtained from the measuring step; and
    selecting an optimum attitude angle of the part of the marine vessel based on the statistical model generated in the statistical model generating step.

18. A method of controlling an attitude angle of a part of a marine vessel according to claim 17, further comprising the step of controlling the attitude angle of the part of the marine vessel based on the optimum attitude angle.

19. A method of controlling an attitude angle of a part of a marine vessel according to claim 17, further comprising the step of calculating a target value of the attitude angle of the part of the marine vessel based on the specific fuel consumption or the alternative values relating to the fuel consumption and based on the statistical model generated in the statistical model generating step.

20. A method of controlling an attitude angle of a part of a marine vessel according to claim 19, wherein in the step of calculating the target attitude angle, the attitude angle at which the specific fuel consumption reaches a maximum value is calculated as the target value of the attitude angle based on the statistical model generated in the statistical model generating step.

21. A method of controlling an attitude angle of a part of a marine vessel according to claim 19, wherein if a difference between the target value of the attitude angle and a current attitude angle exceeds a limit, the limit is set as the target value of the attitude angle.

22. A method of controlling an attitude angle of a part of a marine vessel according to claim 18, wherein the part of the marine vessel of which the attitude angle is controlled is at least one of a hull and a propeller.

23. A method of controlling an attitude angle of a part of a marine vessel according to claim 22, wherein an angle of the propeller with respect to the hull is controlled.

24. A method of controlling an attitude angle of a part of a marine vessel according to claim 17, wherein the alternative values relating to the specific fuel consumption include at least one of actual total fuel consumption, engine speed, navigational speed, and throttle opening.

25. A method of controlling an attitude angle of a part of a marine vessel according to claim 17, further comprising the steps of measuring and controlling a target engine speed and a valve position of an electronic throttle valve unit of the marine vessel.

26. A method of controlling an attitude angle of a part of a marine vessel according to claim 18, wherein the attitude angle controlling step includes controlling a power trim and tilt unit of the marine vessel.

27. A method of controlling an attitude angle of a part of a marine vessel according to claim 17, wherein the step of generating a statistical model includes calculating estimated values of a plurality of parameters needed to generate the statistical model.

28. A method of controlling an attitude angle of a part of a marine vessel according to claim 17, wherein the step of generating a statistical model includes generating the statistical model using one of a least squares method, a weighted least squares method, and a robust estimation method.

29. A method of controlling an attitude angle of a part of a marine vessel according to claim 17, wherein the step of generating a statistical model includes setting an attitude angle determined based on a plurality of conditions within a numeric range around the attitude angle which provides an optimum value for the statistical model, as a target value of the attitude angle.

30. A computer readable medium for storing an attitude angle control apparatus control program executable by a computer to control an attitude angle control apparatus which controls an attitude angle of a part of a marine vessel, such that the attitude angle control apparatus performs the steps of claim 17.

31. An attitude angle control apparatus which controls an attitude angle of a part of a marine vessel, comprising:
  specific fuel consumption acquisition means for acquiring specific fuel consumption of the marine vessel or alternative values relating to the specific fuel consumption;
  evaluated-value calculation means for calculating evaluated values of the attitude angle of the part of the marine vessel based on the specific fuel consumption or the alternative values relating to the specific fuel consumption acquired by the specific fuel consumption acquisition means;
  information acquisition means for acquiring information relating to the evaluated values calculated by the evaluated-value calculation means, the information acquired by the information acquisition means including at least the attitude angle of the part of the marine vessel;
  information storage means for storing the evaluated values calculated by the evaluated-value calculation means and the information acquired by the information acquisition means;
  statistical model generating means for generating a statistical model using the specific fuel consumption as an explained variable and the attitude angle of the predetermined part as an explanatory variable based on the evaluated values calculated by the evaluated-value calculation means and information stored in the information storage means;
  target attitude angle calculation means for calculating a target value of the attitude angle of the part of the marine vessel based on the specific fuel consumption or the alternative values relating to the specific fuel consumption and based on the statistical model generated by the statistical model generating means; and
  attitude angle control means for controlling the attitude angle of the part of the marine vessel so as to match the target value calculated by the target attitude angle calculation means.

32. The attitude angle control apparatus according to claim 31, wherein the alternative values relating to the specific fuel consumption include at least one of actual total fuel consumption, engine speed, navigational speed, and throttle opening.

33. The attitude angle control apparatus according to claim 31, wherein each time the evaluated values are calculated by the evaluated-value calculation means and the information acquired by the information acquisition means are newly obtained, the statistical model generating means generates a statistical model based on the newly obtained evaluated values and acquired information.

34. The attitude angle control apparatus according to claim 31, wherein the statistical model generating means calculates estimated values of a plurality of parameters needed to generate the statistical model.

35. The attitude angle control apparatus according to claim 31, wherein the target attitude angle calculation means calculates, based on the statistical model generated by the statistical model generating means, the attitude angle at which the specific fuel consumption reaches a maximum value, as the target value of the attitude angle.

36. The attitude angle control apparatus according to claim 31, wherein if a difference between the target value of the attitude angle calculated by the target attitude angle calculation means and a current attitude angle exceeds a limit, the target attitude angle calculation means sets the limit as the target value of the attitude angle.

37. The attitude angle control apparatus according to claim 31, wherein the statistical model generating means generates the statistical model using one of a least squares method, a weighted least squares method, and a robust estimation method.

38. The attitude angle control apparatus according to claim 31, wherein the statistical model generating means sets an attitude angle determined based on a plurality of conditions within a numeric range around the attitude angle which provides an optimum value for the statistical model, as the target value of the attitude angle.

39. The attitude angle control apparatus according to claim 31, wherein when acquiring the evaluated values at an initial stage of control, the statistical model generating means adjusts an acquisition range of the evaluated values to include the attitude angle which provides an optimum value for a statistical model generated in the past by the statistical model generating means.

40. An attitude angle control apparatus according to claim 31, wherein the part of the marine vessel that attitude angle control apparatus controls is at least one of a hull and a propeller.

41. An attitude angle control apparatus according to claim 31, wherein the specific fuel consumption acquisition means comprises a constant-speed navigation controller controlling a target engine speed and a valve position of an electronic throttle valve unit of the marine vessel.

42. An attitude angle control apparatus according to claim 31, wherein the attitude angle control means comprises a trim angle controller controlling a power trim and tilt unit of the marine vessel.

43. A marine vessel navigation control apparatus which controls navigation of a marine vessel, wherein the marine vessel navigation control apparatus comprises the attitude angle control apparatus according to claim 31.

44. A marine vessel navigation control apparatus according to claim 43, further comprising an outboard device including at least one of an electronic throttle valve defining a thrust regulator and a power trim and tilt unit defining the attitude angle control means.

45. A marine vessel navigation control apparatus according to claim 43, wherein the specific fuel consumption acquisition means comprises a constant-speed navigation controller including a target engine speed calculation means for determining a target engine speed of the marine vessel and an electronic-throttle valve position calculation means for determining a valve position of an electronic throttle valve to determine total fuel consumption and a speed of the marine vessel for calculating the specific fuel consumption of the marine vessel.

46. A method for controlling an attitude angle of a part of a marine vessel, comprising the steps of:

acquiring specific fuel consumption of the marine vessel or alternative values relating to the specific fuel consumption;

calculating evaluated values of the attitude angle of the part of the marine vessel based on the specific fuel consumption or the alternative values relating to the acquired specific fuel consumption;

acquiring information relating to the evaluated values of the attitude angle of the part of the marine vessel, the information acquired including at least the attitude angle of the part of the marine vessel;

generating a statistical model using the specific fuel consumption as an explained variable and the attitude angle of the part of the marine vessel as an explanatory variable based on the evaluated values calculated and the information acquired;

calculating a target value of the attitude angle of the part of the marine vessel based on the specific fuel consumption or the alternative values relating to the specific fuel consumption and based on the generated statistical model; and controlling the attitude angle of the part of the marine vessel so as to match the calculated target value.

47. A computer readable medium for storing an attitude angle control apparatus control program executable by a computer to control an attitude angle control apparatus which controls an attitude angle of a part of a marine vessel, such that the attitude angle control apparatus performs the steps of claim 46.

* * * * *